US007526167B1

(12) United States Patent
Minelly

(10) Patent No.: US 7,526,167 B1
(45) Date of Patent: Apr. 28, 2009

(54) APPARATUS AND METHOD FOR A HIGH-GAIN DOUBLE-CLAD AMPLIFIER

(75) Inventor: John D. Minelly, Bothell, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/426,302

(22) Filed: Jun. 23, 2006

Related U.S. Application Data

(60) Provisional application No. 60/693,579, filed on Jun. 24, 2005.

(51) Int. Cl.
*G02B 6/036* (2006.01)
*H04B 10/12* (2006.01)

(52) U.S. Cl. ..................... 385/126; 359/341.3

(58) Field of Classification Search ............. 385/126
See application file for complete search history.

(56) References Cited

U.S. PATENT DOCUMENTS

| 4,424,435 | A | | 1/1984 | Barnes, Jr. |
| 5,155,621 | A | * | 10/1992 | Takeda et al. ............ 359/337 |
| 5,235,659 | A | | 8/1993 | Atkins et al. |
| 5,530,710 | A | * | 6/1996 | Grubb .................... 372/6 |
| 6,134,046 | A | * | 10/2000 | Shukunami et al. .... 359/337.21 |
| 6,222,962 | B1 | * | 4/2001 | Nilsson et al. ............ 385/37 |
| 6,324,326 | B1 | * | 11/2001 | Dejneka et al. .......... 385/123 |
| 6,483,974 | B1 | * | 11/2002 | Waarts .................. 385/123 |
| 6,493,476 | B2 | | 12/2002 | Bendett |
| 6,625,363 | B2 | | 9/2003 | Carter et al. |
| 6,636,678 | B1 | | 10/2003 | Bendett et al. |
| 6,650,816 | B2 | * | 11/2003 | Bazylenko et al. ........ 385/129 |
| 6,711,918 | B1 | * | 3/2004 | Kliner et al. ............ 65/390 |
| 6,831,934 | B2 | * | 12/2004 | Wang et al. ............... 372/6 |
| 6,833,946 | B2 | * | 12/2004 | Islam .................... 359/334 |

(Continued)

OTHER PUBLICATIONS

Bayindir et al., "Metal insulator semiconductor optoelectronic fibres", "Nature", Oct. 14, 2004, pp. 826-829, vol. 431.

(Continued)

*Primary Examiner*—Uyen Chau N Le
*Assistant Examiner*—Kajli Prince
(74) *Attorney, Agent, or Firm*—Charles A. Lemaire; Lemaire Patent Law Firm P.L.L.C.

(57) ABSTRACT

An optical apparatus design and method for suppressing cladding-mode gain in fiber- and other waveguide-amplification devices. In some embodiments, a signal-wavelength-absorbing core or region is included within the pump cladding or the pump waveguide, in order to absorb signal-wavelength radiation that occurs in the regions where only pump-wavelength radiation is wanted. This absorbing region prevents cladding-mode gain, thus preserving more pump-wavelength excitation for amplifying the desired signal radiation. In other embodiments, the refractive-index profile of the fiber or other waveguide is adjusted to reduce the numeric aperture and thus reduce the angle of light that will remain in the cladding. Since amplified spontaneous emission (ASE) occurs at all angles, a lower-NA fiber will leak a higher proportion of ASE (since a relatively lower portion of the ASE radiation is within the smaller angle that is retained within a low-NA fiber), while pump light, which was introduced into the fiber within the lower-NA angle will remain in the cladding.

32 Claims, 11 Drawing Sheets

U.S. PATENT DOCUMENTS

| | | |
|---|---|---|
| 6,845,204 B1 | 1/2005 | Broeng et al. |
| 6,856,742 B2 | 2/2005 | Broeng et al. |
| 6,954,564 B2 | 10/2005 | Bendet |
| 2002/0159736 A1* | 10/2002 | Dejneka et al. ............. 385/127 |
| 2004/0028358 A1* | 2/2004 | Cremer ....................... 385/123 |
| 2005/0105867 A1* | 5/2005 | Koch et al. .................. 385/125 |
| 2005/0135815 A1* | 6/2005 | Gerwe et al. ................ 398/188 |

OTHER PUBLICATIONS

Kuriki et al., "Hollow multilayer photonic bandgap fibers for NIR applications", "Optics Express", Apr. 19, 2004, pp. 1510-1517, vol. 12, No. 8.

* cited by examiner

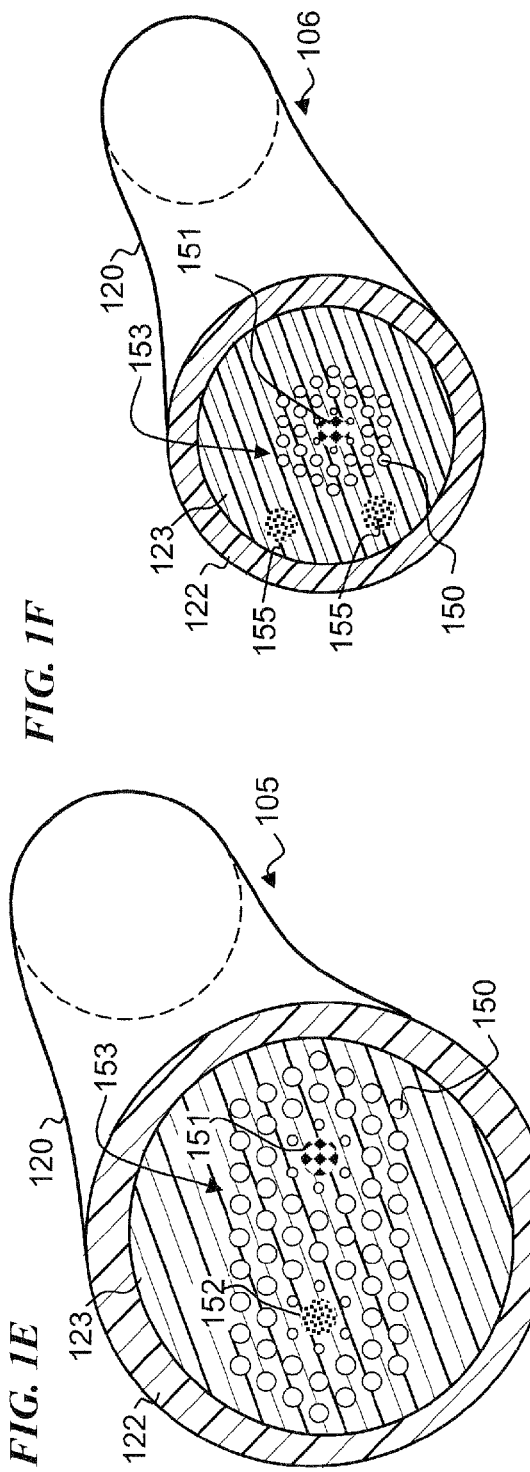
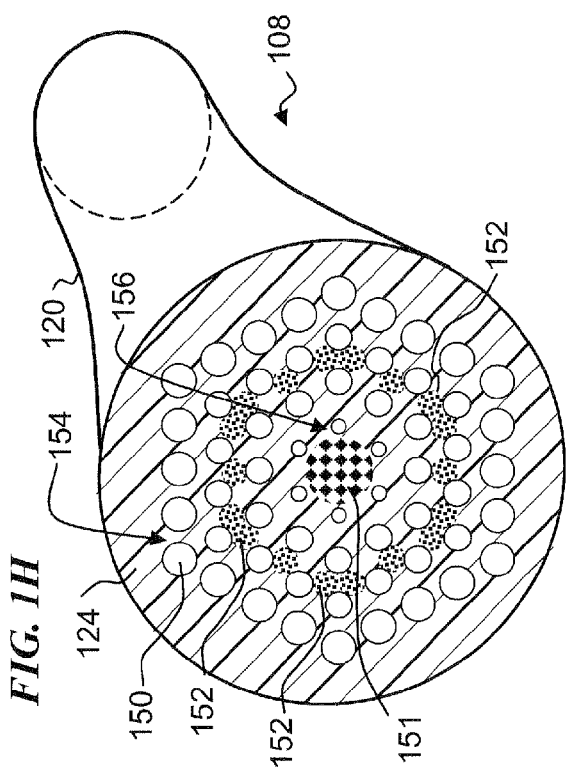
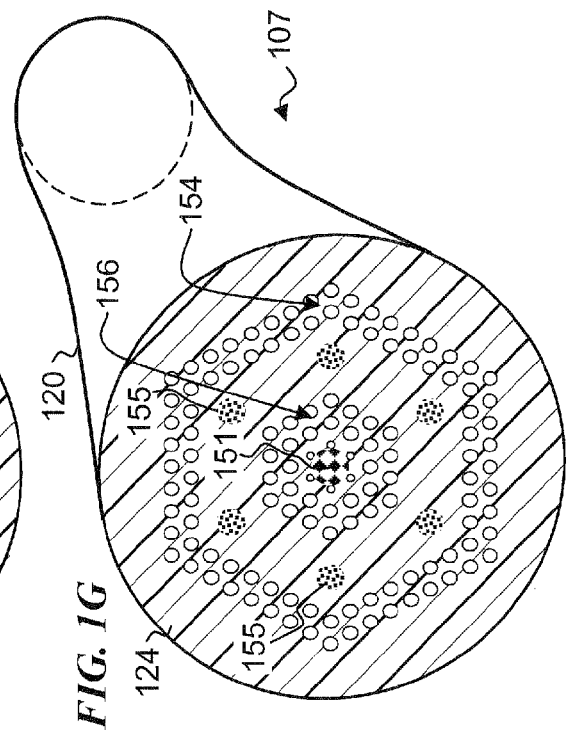
FIG. 1E
FIG. 1F
FIG. 1G
FIG. 1H

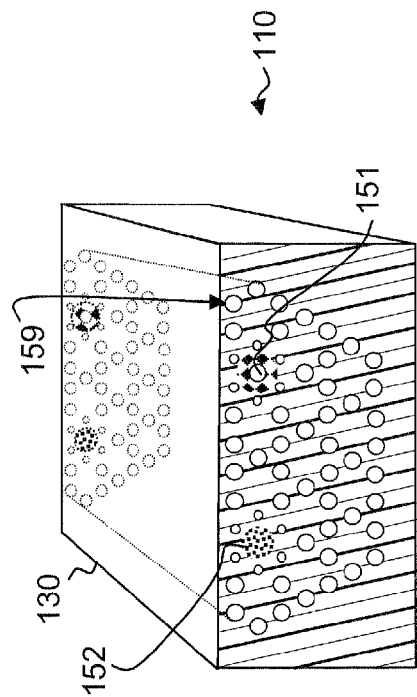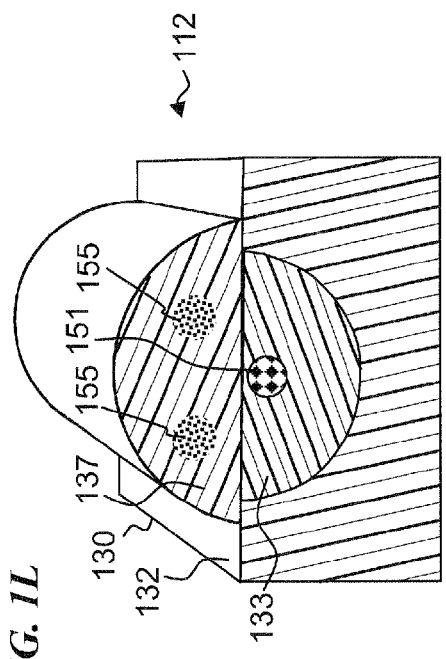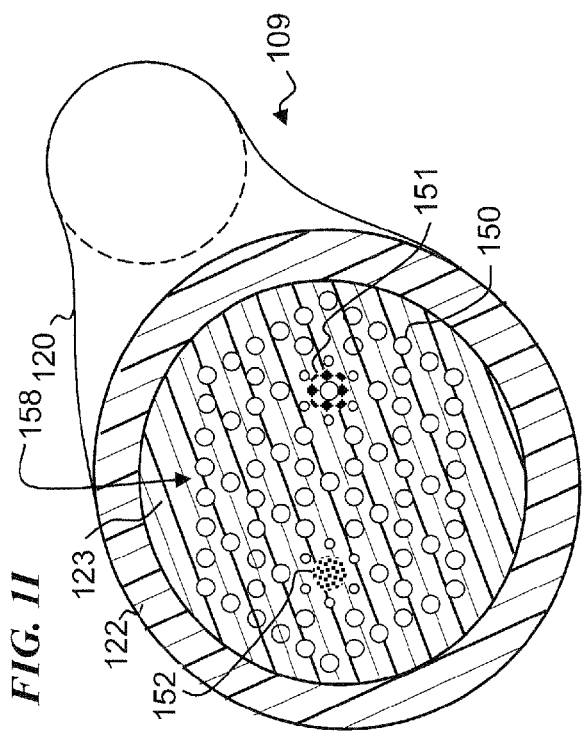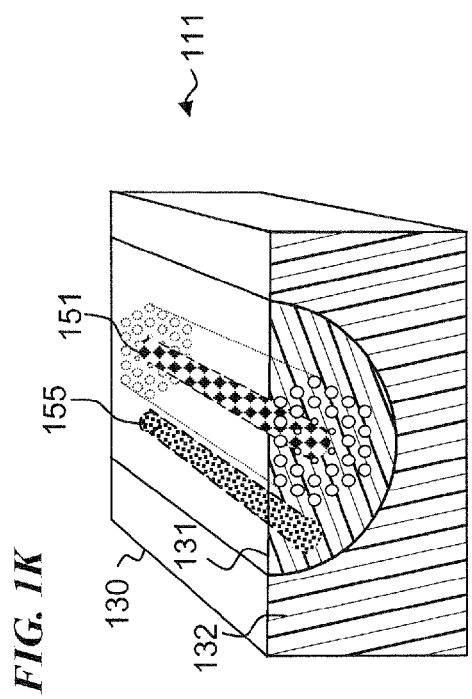

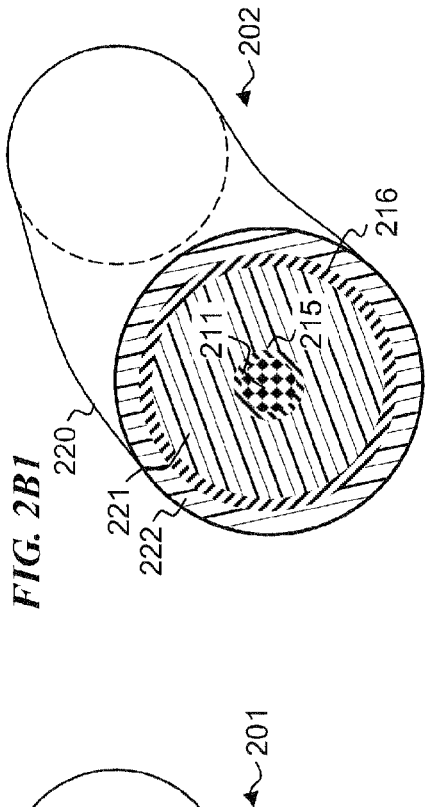
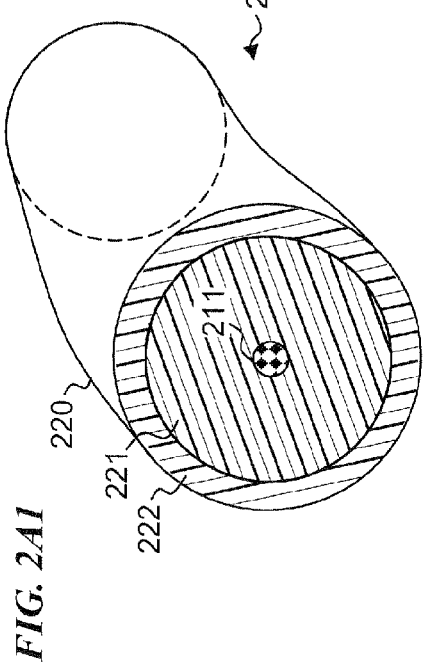
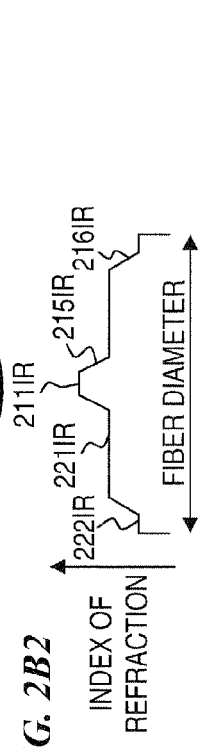
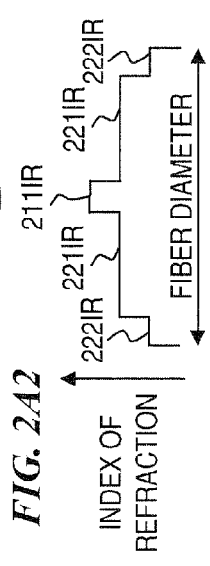
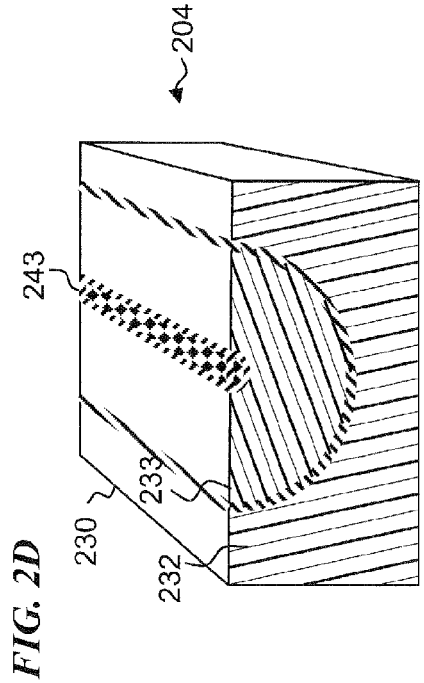
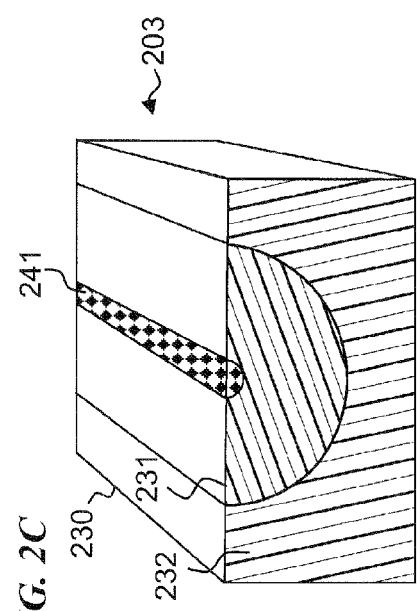

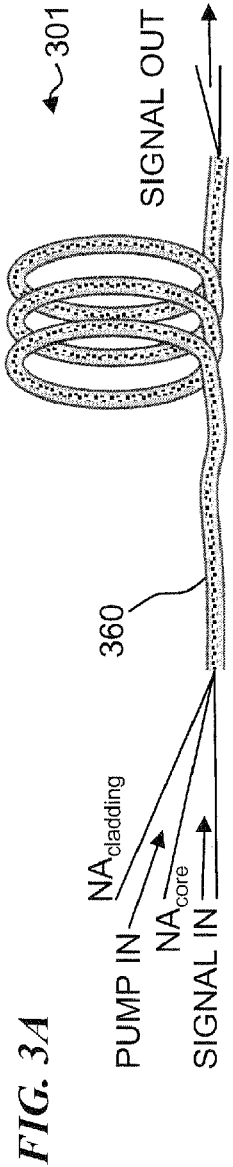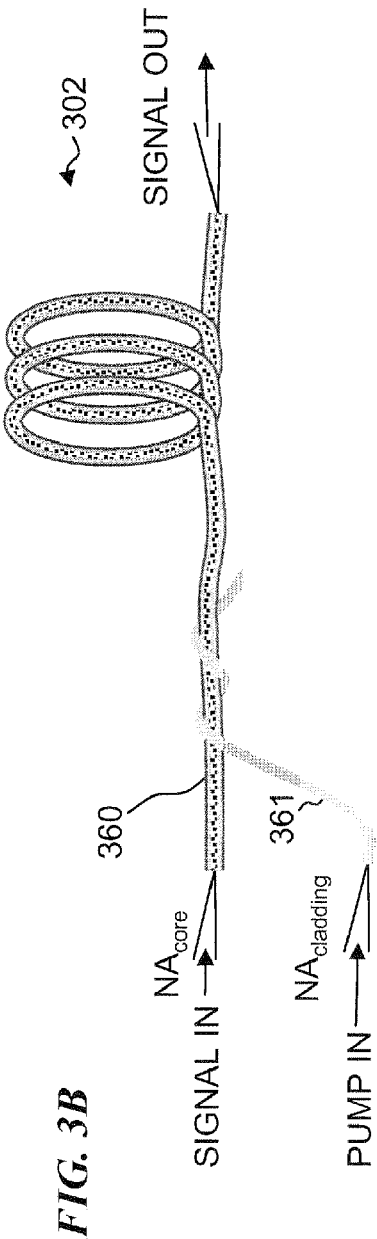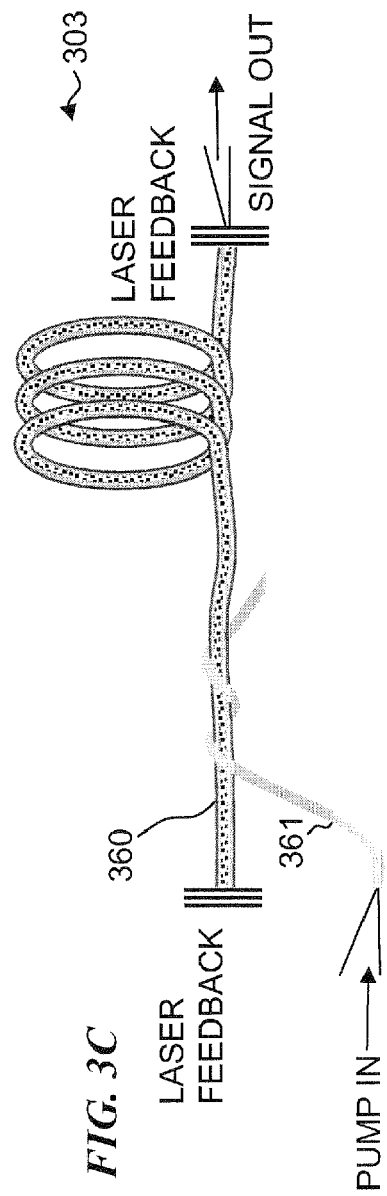
FIG. 3A
FIG. 3B
FIG. 3C

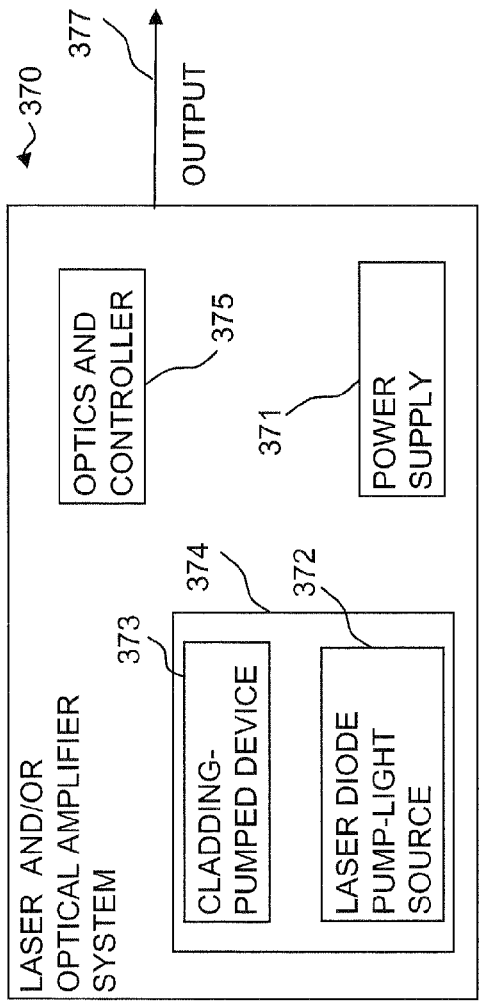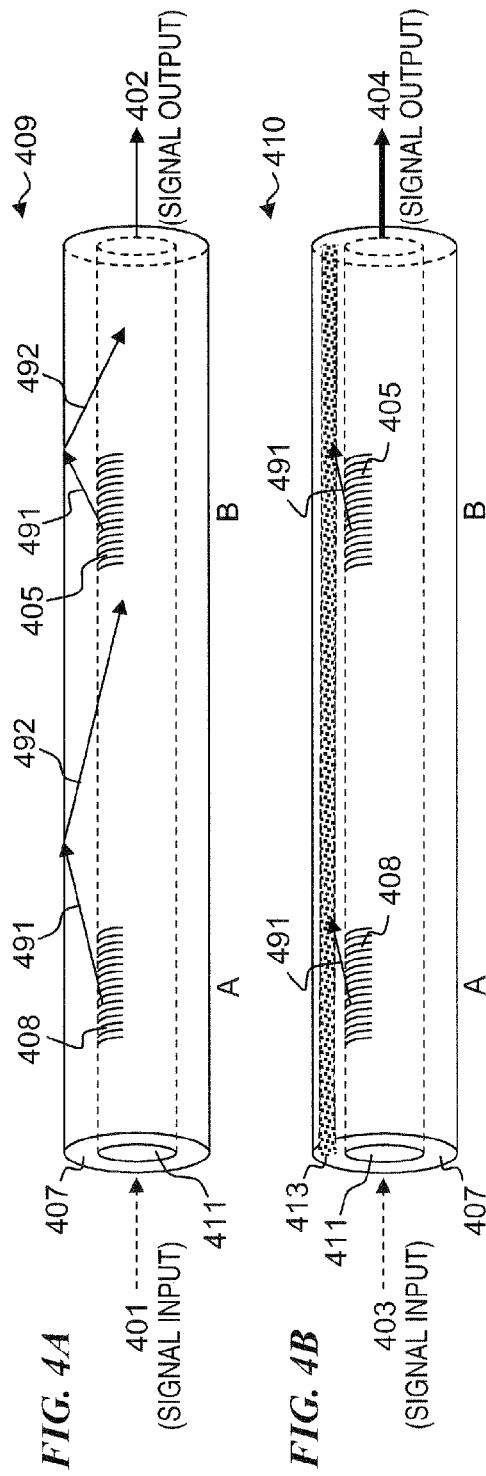

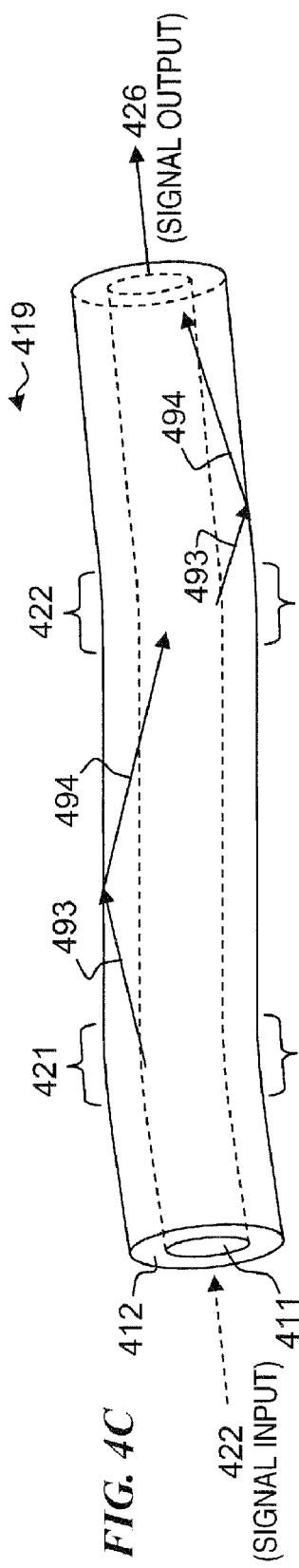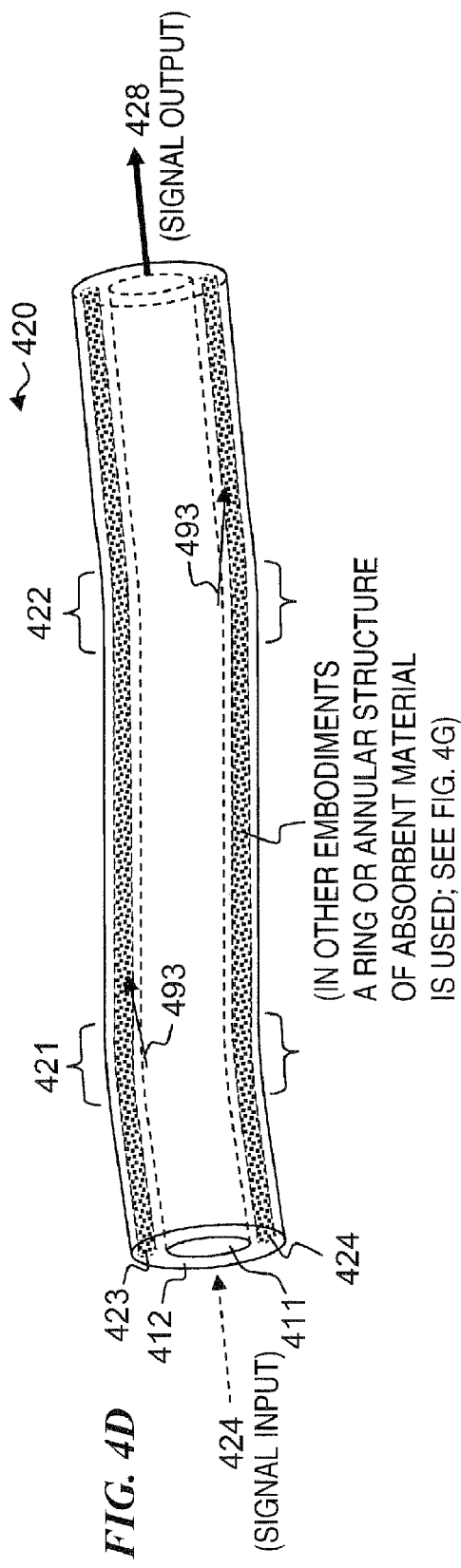

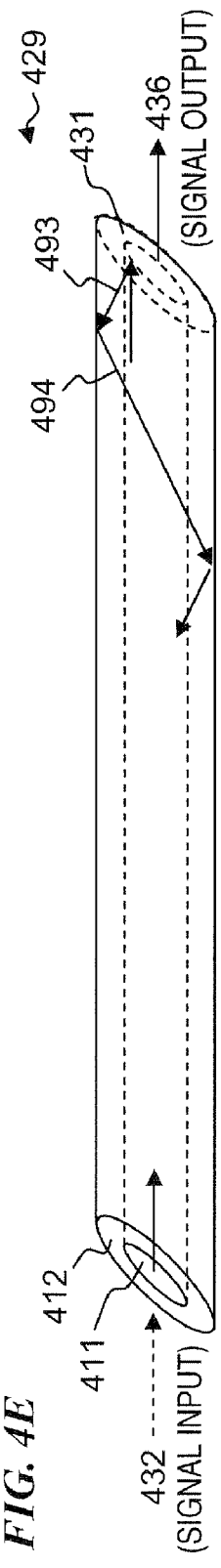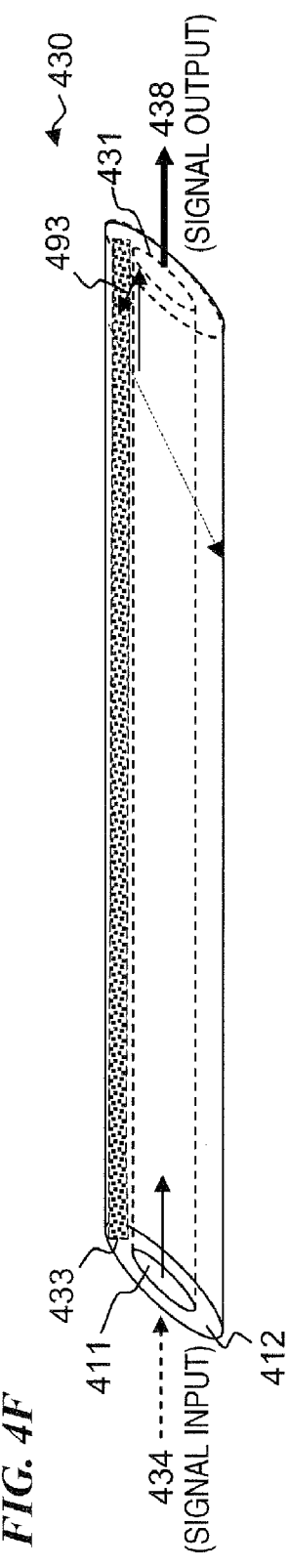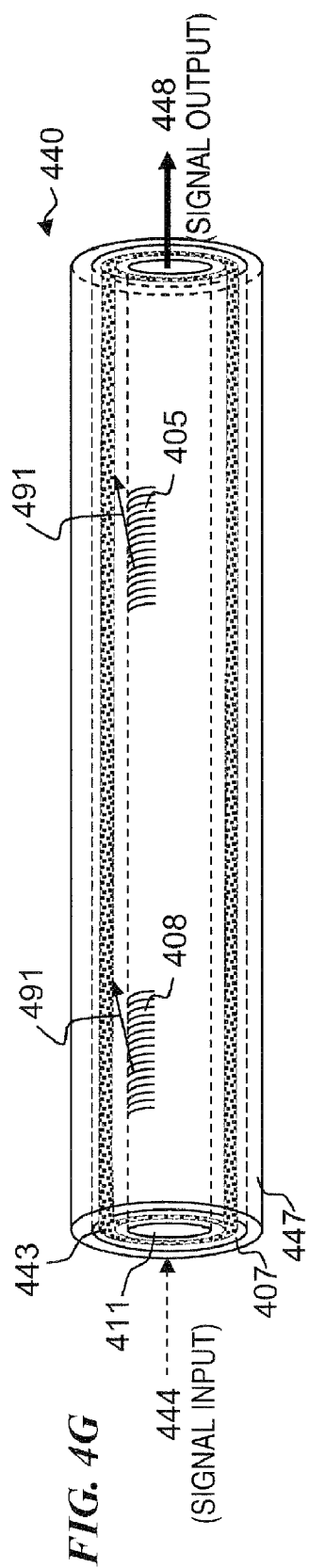

APPARATUS AND METHOD FOR A HIGH-GAIN DOUBLE-CLAD AMPLIFIER

RELATED APPLICATIONS

This invention claims benefit of U.S. Provisional Patent Application 60/693,579 filed on Jun. 24, 2005, titled "APPARATUS AND METHOD FOR A HIGH-GAIN DOUBLE-CLAD AMPLIFIER" which is hereby incorporated by reference in its entirety.

FIELD OF THE INVENTION

The invention relates generally to the field of optical waveguide manufacturing and particularly to optical fibers and processes for making optical fibers that reduce or suppress cladding modes and cladding noise-amplification mechanisms.

BACKGROUND OF THE INVENTION

Typical optical-fiber amplifiers and lasers are apparatus that provide optically pumped gain useful for creating and sustaining laser oscillations and/or for providing gain to an optical signal. In some embodiments, such optical-fiber amplifiers and lasers employ, for example, optical fibers doped with one or more rare-earth species that absorb pump light/radiation at one or more first wavelengths (the pump wavelength(s)) and then provide stimulated emission at one or more second wavelengths (the gain wavelength(s)).

When an ion of the rare-earth species (such as erbium or ytterbium, for example), already excited to a higher energy level by absorption of a pump photon, interacts with a first photon having a wavelength within a narrow range specific to the type of ion and its ionization state, the ion undergoes stimulated emission wherein an electron of the ion drops to a lower energy state in the ion emitting energy equal to its drop in energy such that two photons result, wherein both resulting photons have the identical frequency, phase, direction, and polarization as the first photon. Such stimulated emission can be used for amplification of a light signal at the gain wavelengths, with applications including optical-fiber lasers and amplifiers.

Some conventional optical waveguides, such as the typical optical fibers well-known in the art, include a core surrounded by cladding having an index of refraction that is lower than the index of refraction of the core. Such conventional optical fibers typically maintain light in the core by total internal reflection. Other conventional optical waveguides, such as optical fibers, maintain light localization of light or control of electromagnetic fields in cavities or waveguides by applying a different physical property—the so-called photonic-bandgap (PBG) effect, as described, for example, in U.S. Pat. No. 6,845,204 issued 18 Jan. 2005 to Broeng et al., and U.S. Pat. No. 6,856,742 issued 15 Feb. 2005 to Broeng et al., which are both incorporated herein by reference. (Devices that exhibit the so-called PBG effect are also called photonic-crystal devices.)

In certain conventional optical-fiber lasers and amplifiers (and certain conventional optical waveguides formed at a surface of a planar substrate), pump radiation is introduced directly into the core. Other optical apparatus include cladding-pumped optical fibers, such as described, for example, in U.S. Pat. No. 6,625,363 issued 23 Sep. 2003 to Carter et al., which is incorporated herein by reference. Still other conventional apparatus include cladding-pumped waveguides that are fabricated on slab-type substrates such as described in U.S. Patent Application Publication Number 2002/0106150 A1 published 8 Aug. 2002, now U.S. Pat. No. 6,954,564 issued 11 Oct. 2005 to Bendett, which is incorporated herein by reference.

In an active or amplifying optical fiber, the core is typically used to carry and/or amplify light of a signal wavelength (e.g., a longer wavelength such as 1060 nanometers (nm)) by absorbing light of a pump wavelength (e.g., a shorter wavelength such as 960 nm), and providing energy for stimulated emission amplification (typically called lasing if done in a resonant cavity) of radiation of the signal wavelength. In many applications, there are one or more lowest-order modes (in free space, the lowest order mode has a Gaussian profile and is called TEM00, while in a fiber's core, the lowest order mode has generally linearly polarized Gaussian profile and is called LP01). The highest power of this lowest-order mode is typically in the center of the core, while higher-order modes tend to exist at the outer core or its boundary. When the lowest-order mode becomes dominant, it depletes energy from the pump-light excited lasing species in the center, while allowing a higher population of energized lasing species at the core boundary, which allows amplified spontaneous emission (ASE) and high-order modes (i.e., where the core is supporting multiple modes) to be amplified around the outer core, to the detriment of the dominant desired mode. Since at least some of the light of the ASE and/or the higher-order modes is at exactly the same wavelength as the desired signal, it is difficult to remove using wavelength-selective filtering. Because of quantum effects, the light traveling along the core boundary (even portions of the lowest-order mode) will form a so-called evanescent wave existing both just outside and just inside the core, and that light will leak from the core in certain circumstances, for example if the fiber is bent, or if the core has a diffraction grating imprinted on it. If that leaked signal light later re-enters the core, it will not be in phase with the desired dominant mode, and will constitute noise or undesired bandwidth spreading of the desired signal. Some fibers supply pump light in a cladding that surrounds a length of the fiber's core. It is undesirable to have signal light in that pump cladding, for the reasons just described.

Certain configurations of optical waveguides, including optical fibers, exhibit undesirable amplified spontaneous emission (ASE), higher-order modes, or other noise propagation or amplification in the cladding or external pump waveguide (typically called cladding modes). There is a need for improved optical devices including optical fibers that suppress cladding modes.

SUMMARY OF THE INVENTION

The present invention provides improved optical devices including optical fibers that suppress cladding modes. Some embodiments of the invention provide cladding pumping (or pumping within a waveguide that surrounds the primary amplification waveguide). In some embodiments, a secondary core, waveguide, or volume within the pump cladding or pump waveguide includes doping with a species (such as thulium, for example) that preferentially absorbs light of the signal wavelength (e.g., radiation from undesirable amplified spontaneous emission (ASE) or other noise) that is in the cladding or pump waveguide, while substantially not absorbing radiation of the pump wavelength.

The present invention is useful for suppressing instabilities that arise from perturbations in an optically pumped gain fiber, which, for example, can couple ASE or one or more higher-order optical propagation modes of the core into a cladding waveguide. In some embodiments, the cladding waveguide is used to convey pump light along and into the core of the fiber. In cases where there are one or more perturbations that allow forward-propagating or backward-propagating waves (e.g., with the correct phase and wavelength properties) from the core into the pump cladding and/or from the pump cladding into the core, instabilities can arise. In some embodiments, the present invention provides one or more signal-wavelength-absorbing regions (for example, located in the pump cladding, in some embodiments). In some embodiments, the absorbing regions are more effective in suppressing certain instabilities and/or other undesirable effects than other methods, as cladding modes are attenuated between the perturbation points.

BRIEF DESCRIPTION OF THE DRAWINGS

FIG. 1E is a magnified perspective view partially in cross-section of dual photonic-band-gap cores including suppression region within a secondary cladding optical fiber 105 according to some embodiments of the present invention.

FIG. 1F is a magnified perspective view partially in cross-section of single-photonic-band-gap-core-waveguide-plus-suppression-region within a larger secondary cladding optical fiber 106 according to some embodiments of the present invention.

FIG. 1G is a magnified perspective view partially in cross-section of single-photonic-band-gap-core-waveguide-plus-suppression-region within a larger photonic-band-gap "cladding" optical fiber 107 according to some embodiments of the present invention.

FIG. 1H is a magnified perspective view partially in cross-section of single-photonic-band-gap-core-waveguide-plus-suppression-region within a larger photonic-band-gap "cladding" optical fiber 108 according to some embodiments of the present invention.

FIG. 1I is a magnified perspective view partially in cross-section of dual photonic-band-gap cores including suppression region within a secondary cladding optical fiber 109 according to some embodiments of the present invention.

FIG. 1J is a magnified perspective view partially in cross-section of dual-core-waveguide-plus-suppression-region PBG-waveguide optical device 110 in a slab-type substrate according to some embodiments of the present invention.

FIG. 1K is a magnified perspective view partially in cross-section of single-core-amplifying-waveguide PBG-waveguide within a pump waveguide optical device 110 in a slab-type substrate according to some embodiments of the present invention.

FIG. 1L is a magnified perspective view partially in cross-section of single-core-amplifying-waveguide having a substrate-overcladding-pump-waveguide optical device 110 in a slab-type substrate according to some embodiments of the present invention.

FIG. 2A1 is a magnified perspective view partially in cross-section of dual-clad cladding-pumped optical fiber 201 with low numerical aperture (NA) outer cladding according to some embodiments of the present invention.

FIG. 2A2 is a schematic graphical depiction of differing indices of refraction across the diameter of optical fiber 201 shown in FIG. 2A1

FIG. 2B1 is a magnified perspective view partially in cross-section of dual-clad cladding-pumped optical fiber 202 with low-NA outer cladding with graded-index profiles according to some embodiments of the present invention.

FIG. 2B2 is a schematic graphical depiction of differing indices of refraction across the diameter of optical fiber 202 shown in FIG. 2B1

FIG. 2C is a magnified perspective view partially in cross-section of single-waveguide core within a low-NA-pump waveguide optical device 203 according to some embodiments of the present invention.

FIG. 2D is a magnified perspective view partially in cross-section of single-core-waveguide within a low-NA-pump waveguide optical device optical fiber 204 with graded-index profiles according to some embodiments of the present invention.

FIG. 3A is a schematic block diagram of an end-cladding-pumped optical amplifier 301 according to some embodiments of the present invention.

FIG. 3B is a schematic block diagram of a star-coupler-cladding-pumped optical amplifier 302 according to some embodiments of the present invention.

FIG. 3C is a schematic block diagram of a cladding-pumped laser 303 according to some embodiments of the present invention.

FIG. 3F is a schematic block diagram of a cladding-pumped laser system 306 according to some embodiments of the present invention.

FIG. 4A is a perspective view of a single-clad fiber, where the single cladding is used to inject pump light into a core.

FIG. 4B is a perspective view of a single-clad fiber, with a single light-absorbing rod located within the single cladding.

FIG. 4C is a perspective view of a single-clad fiber with bending.

FIG. 4D is a perspective view of a single-clad fiber with bending, with two light-absorbing rods located within the single cladding.

FIG. 4E is a perspective view of a single-clad fiber with angled end-caps or facets, according to some embodiments of the present invention, in which coupling occurs between core and cladding modes via angled end-face reflections.

FIG. 4F is a perspective view of a single-clad fiber with an angled end-cap or facet and absorbing rod within the single cladding.

FIG. 4G is a perspective view of a double-clad fiber with a ring or annular absorbing and/or ASE-suppression region within the inner cladding.

DESCRIPTION OF EMBODIMENTS

Figure 1B:
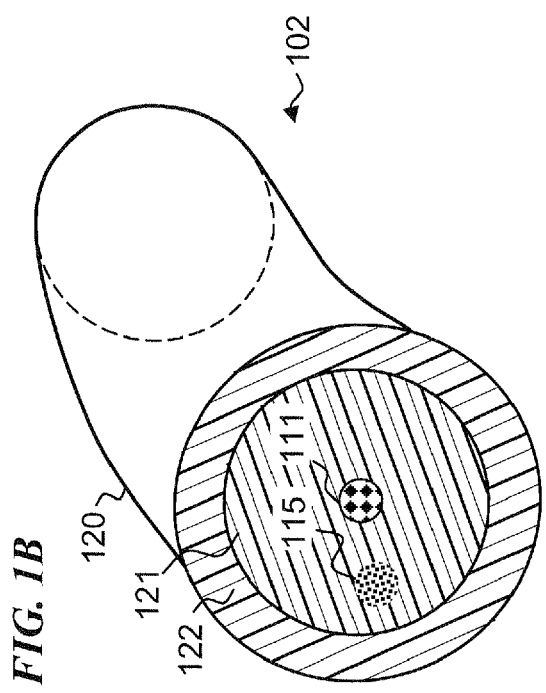
FIG. 1B is a magnified perspective view partially in cross-section of dual-clad single-core-plus-suppression-region optical fiber 102 according to some embodiments of the present invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As used herein, light, radiation, and electromagnetic radiation are equivalent terms and include any suitable wavelength of electromagnetic radiation including, for example, ultra-violet, visible, and/or infra-red ranges of wavelengths. The terms pump-wavelength radiation and pump-wavelength light are equivalent terms and include any suitable wavelength of electromagnetic radiation suitable for pumping one or more laser or amplifying species (such as rare-earth elements placed as dopants in optical-fiber glass, for example) to an excited state. The terms signal-wavelength radiation and signal-wavelength light are equivalent terms and include any suitable wavelength of electromagnetic radiation suitable for carrying an information signal or for providing monochromatic power light (such as for opthalmic laser surgery or other ablative or cutting tasks), and whose power is amplified by stimulated emission from one or more laser species in an excited state.

As used herein, cladding-mode gain is any signal-wavelength amplification or gain that occurs outside the signal waveguide or fiber core. A cladding mode is a mode with an effective index ($\beta/k$) which lies between the refractive index of the outer cladding and the refractive index of the inner core. While most of the power is located in the cladding there is still an overlap between the cladding mode profile and the doped inner core. Cladding-mode gain includes gain in any optic-fiber-cladding layer (e.g., within an inner cladding of a double-clad optical fiber) in an apparatus that injects pump light into one or more cladding layers, as well as gain in a pump waveguide that is used deliver pump light to a lasing or amplifying waveguide, e.g., on an integrated planar waveguide system. The gain may be for a proportion of the signal light that leaks into the cladding as a result of imperfect core-mode excitation, or it may be for ASE intrinsic to the amplifier even in the event of perfect signal excitation.

In some embodiments, light from the core is coupled into the cladding by a local or distributed perturbation. Examples may be fiber bends, fiber tapers, short-period or long-period fiber gratings or splices to inline components. Light so-coupled will propagate with the reduced cladding-mode gain. In a reciprocal manner, light propagating in the cladding can be coupled by perturbations back into the core, thus creating a multi-path interference (MPI) scenario. This can lead to instabilities in the amplifier or laser system and can potentially lead to self pulsation and system damage. Cladding-mode attenuation is one way of suppressing these effects.

In some embodiments, two or more rare-earth dopants are used in an amplifying waveguide. One rare earth serves as the pump-energy absorber. A second rare earth is the lasing or amplifying species. A population inversion is produced by energy transfer from the absorber rare earth to the lasing rare earth.

Using an Absorbing Region to Suppress Cladding Modes

In some embodiments, one or more rare-earth dopants are used in an absorbing or suppression waveguide or region. One or more rare earth, such as thulium, for example, serves as the signal-energy absorber. The absorbed signal energy is dissipated as heat (i.e., a temperature increase) in the device, or as lower-frequency light that is less problematic because it has a frequency that does not match a band gap of the lasing species and thus does not deplete the inverted population of the lasing species.

In some embodiments, the optical fiber or device includes glass, plastic, or a crystal such as yttrium aluminum garnet or thulium aluminum garnet or other rare-earth aluminum garnet, or rare-earth fluoride nanoparticles, doped with one or more rare-earth elements selected to match a desired absorber or lasing wavelength, e.g., erbium, ytterbium, thulium, and/or one or more other rare earth of the Lanthanide series of elements such as lanthanum, cerium, praseodymium, neodymium, promethium, samarium, europium, gadolinium, terbium, dysprosium, holmium, and/or lutetium. Some embodiments also include other dopants used for lasing, absorbing, and/or index-of-refraction modification.

Some aspects of the present invention relate to suppression of cladding-mode gain with the aim of providing higher signal gain in a large-mode-area (LMA) double-clad structure. With most optical fibers, the size of the mode is pretty small, for example, less than 10 microns (micrometers). The fundamental-mode size depends upon the refractive-index profile, which determines the mode diameter and numerical aperture (NA=sine of the acceptance angle $\Theta_a$). For optical fibers having a step change in index of refraction, where the core $n_1$ and the cladding $n_2$, the formula for numerical aperture is $$NA = \sin \Theta_a = (n_1^2 - n_2^2)^{1/2}.$$

For graded-index fiber (having a refractive index profile that varies as a function of the radial distance from its axis), in the paraxial approximation, the ray trajectories are governed by paraxial-ray equations ($d/dz(n\, dx/dz) = -\delta n/\delta x$, $d/dz(n\, dy/dz) = -\delta n/\delta y$). For a graded-index fiber having a profile that satisfies, for example, the equation $$n^2 = n_0^2(1 - \alpha^2(x^2 + y^2)), \text{ its } NA = \sin \Theta_a = -n_0 a\alpha$$

where $\Theta_a$ is the maximum angle $\Theta_0$ for a ray incident from air to the axis of the fiber for which the ray trajectory is contained within the fiber, $\alpha$ is a constant sufficiently small that $\alpha^2(x^2+y^2)\ll1$, and a is the radius of the fiber.

In LMA fibers, the glass compositions are tweaked to make the mode diameter larger, and the NA of the core smaller. This means the optical spot in the fiber covers a larger area, so the fiber can handle more peak power without nonlinear effects in the glass degrading the light transmission. In general, it is relatively easy to make a larger-diameter glass core, but that alone generally does not make the size of the fundamental mode larger, but rather tends to make a multimode fiber, and the brightness (the product of beam-diameter times diffraction-angle) would suffer, and the beam cannot be focussed to as small a spot later on. The NA is a measure of the angular divergence of the light (the sine of the angle between the fiber axis and the cone of light) going into and coming out of the fiber, so a small NA means a smaller angle (both of the acceptance angle of light entering the fiber and of the meridional (rays along the meridian) and/or helical rays within the fiber). Some embodiments of the present invention are particularly relevant to the problem of increasing energy extraction at low repetition-rates.

Cladding-mode gain is usually overlooked in the design of a double-clad amplifier. The rationale is that the area ratio between core and cladding is such that the gain of these modes is reduced to a very small level and therefore the energy loss to cladding modes (amplification of light in the cladding or the pump waveguide that has the signal-light's frequency) is minimal. This argument is flawed: after all, if the cladding modes do not see gain, then the pump will not be absorbed either.

In some embodiments, this limits the advantage of large-mode-area, low NA (LMA-low NA) cores in terms of energy storage. While the low NA generally enables mode quality enhancement via the differential bend-loss technique, it can lead to complications in the presence of cladding-mode gain.

For amplification in the 1550-nanometers (nm) region, some embodiments of the present invention overcome this limitation by inserting within (or in optical communication with) the cladding waveguide a second "core" or doped region, which is heavily doped with thulium (Tm) ions or other species that selectively absorb signal-wavelength radiation. Tm ions can absorb 1550-nm (or other signal wavelength) radiation much more strongly than even the most heavily doped erbium (Er) fiber, while absorption at 920 nm and 980 nm (or other pump wavelength) is relatively weak. Tm ions of a suitable concentration and core size can therefore suppress the build up of cladding modes (i.e., amplification of spontaneous emission or other signal-wavelength radiation in the cladding), allowing restoration of the same conditions as can be achieved by core pumping. Some embodiments of the optical-device design are illustrated in FIG. 1A, FIG. 1B, FIG. 1C, and FIG. 1D. Other embodiments are shown in FIG. 1D, FIG. 1E, FIG. 1F, and FIG. 1G.

Figure 1A:
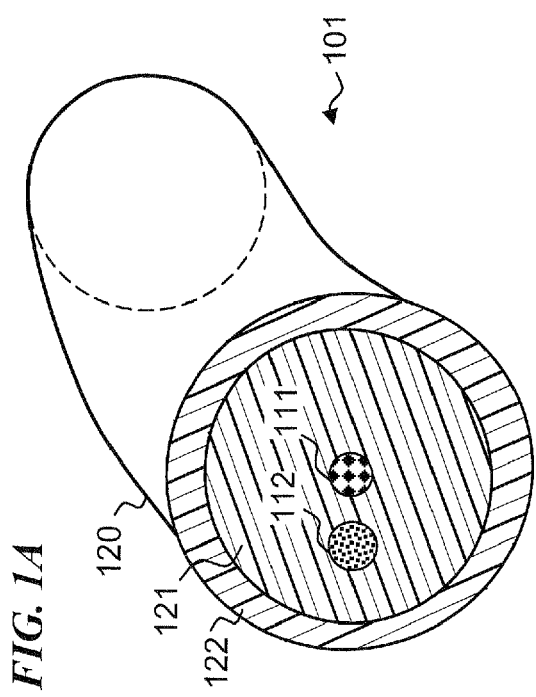
FIG. 1A is a magnified perspective view partially in cross-section of dual-clad dual-core optical fiber 101 according to some embodiments of the present invention.

FIG. 1A is a magnified perspective view partially in cross-section of dual-clad dual-core optical device 101 according to some embodiments of the present invention. In some embodiments, device 101 includes optical fiber 120 having an outer cladding 122 surrounding an inner cladding 121, which contains an amplifying core 111 and an absorbing core 112. Amplifying core 111 has a higher index of refraction than cladding 121, and so contains signal light within it (for example, by total internal reflection). In some embodiments, absorbing core 112 has a higher index of refraction than cladding 121, and so contains signal light that it acquires within it (for example, also by total internal reflection). In some embodiments, pump radiation is introduced into cladding 121, and the pump radiation introduces energy into the amplifying core 111, where the energy provides gain to signal light propagating along the length of amplifying core 111. Any spontaneous emission within the core or signal light that happens to escape the amplifying core 111, would typically be amplified by interaction with pumped species in the cladding, thus establishing a cladding mode of noise propagating in cladding. However, radiation of the signal wavelength can and will pass from cladding 121 into absorbing core 112 (which has a higher index of refraction), where it is absorbed. In some embodiments, absorbing core 112 is heavily doped with thulium or other suitable species that preferentially absorbs radiation of the signal wavelength (e.g., light of about 1550-nm wavelength), but does not absorb radiation of the pump wavelength (e.g., light of about 980-nm wavelength).

FIG. 1B is a magnified perspective view partially in cross-section of dual-clad single-core-plus-suppression-region optical fiber 102 according to some embodiments of the present invention. In some embodiments, device 102 includes optical fiber 120 having an outer cladding 122 surrounding an inner cladding 121 that contains an amplifying core 111 and an absorbing region 115. Amplifying core 111 has a higher index of refraction than cladding 121, and so contains signal light within it (for example, by total internal reflection). In some embodiments, absorbing region 115 has the same index of refraction as cladding 121, and so allows both pump light and signal light to easily pass its boundaries in both directions (inwards from cladding 121, and outwards into cladding 121). Pump radiation is introduced into cladding 121, and the pump radiation introduces energy into the amplifying core 111, where the energy provides gain to signal light propagating along the length of amplifying core 111. Any spontaneous emission within the core or signal light that happens to escape the amplifying core 111, would typically be amplified by interaction with pumped species in the cladding, thus establishing a cladding mode of noise propagating in cladding. However, radiation of the signal wavelength can and will pass from cladding 121 into absorbing region 115 (which has the same index of refraction), where it is absorbed. Pump radiation is not absorbed, but passes easily into and out of absorbing region 115. In some embodiments, absorbing region 115 is heavily doped with thulium or other suitable species that preferentially absorbs radiation of the signal wavelength (e.g., light of about 1550-nm wavelength), but does not absorb radiation of the pump wavelength (e.g., light of about 980-nm wavelength).

Figure 1D:
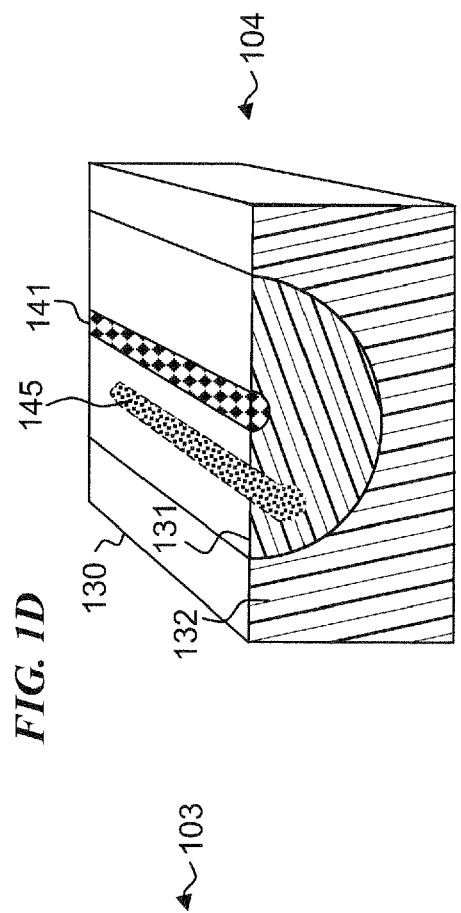
FIG. 1D is a magnified perspective view partially in cross-section of single-core-waveguide-plus-suppression-region-within a larger pump-light-waveguide optical device 104 in a slab-type substrate according to some embodiments of the present invention.
Figure 1C:
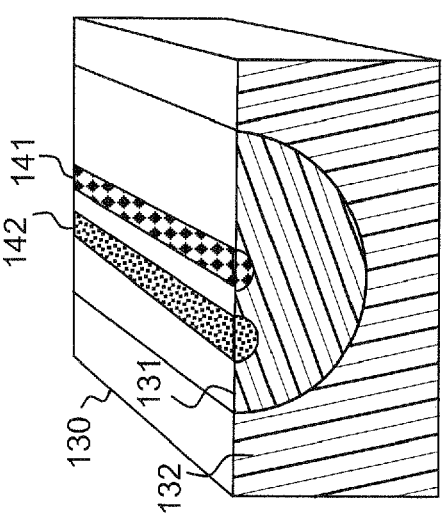
FIG. 1C is a magnified perspective view partially in cross-section of dual-waveguide-cores-within a larger waveguide optical device 103 according to some embodiments of the present invention.

FIG. 1C is a magnified perspective view partially in cross-section of dual-waveguide-cores-within a larger slab, rod, or chip-type substrate waveguide optical device 103 according to some embodiments of the present invention. Such waveguide optical devices include planar waveguide devices having one or more optical circuits that include, for example, waveguides, amplifiers, lasers, gratings, mirrors, splitters, couplers, switches, and/or detectors integrated onto a single planar platform. In some embodiments, device 103 includes optical substrate 130 having an outer region 132 surrounding an inner pump waveguide 131 that contains a smaller-diameter amplifying waveguide 141 and an absorbing waveguide 142. Amplifying waveguide 141 has a higher index of refraction than pump waveguide 131, and so contains signal light within it (for example, by total internal reflection). In some embodiments, absorbing waveguide 142 has a higher index of refraction than pump waveguide 131, and so contains signal light that it acquires within it (for example, also by total internal reflection). Pump radiation is introduced into pump waveguide 131, and the pump radiation introduces energy into the amplifying waveguide 141, where the energy provides gain to signal light propagating along the length of amplifying waveguide 141. Any spontaneous emission within the pump waveguide 131 or signal light that happens to escape the amplifying waveguide 141, would typically be amplified by interaction with pumped species in the cladding, thus establishing a cladding mode of noise propagating in pump waveguide 131. However, radiation of the signal wavelength can and will pass from pump waveguide 131 into absorbing waveguide 142 (which has a higher index of refraction), where it is absorbed. Pump radiation is not absorbed in absorbing waveguide 142. In some embodiments, absorbing waveguide 142 is heavily doped with thulium or other suitable species that preferentially absorbs radiation of the signal wavelength (e.g., light of about 1550-nm wavelength), but does not absorb radiation of the pump wavelength (e.g., light of about 980-nm wavelength).

In some embodiments, the invention uses single-transverse-mode amplifying waveguides supporting 1550-nm wavelength fabricated in a commercially available phosphate alkali glass, wherein at least the amplifying waveguides are doped with an amplifying species, e.g., co-doped with 0.99 times $10^{20}$ $Er^{3+}$ ions/cm$^3$ and 3.97 times $10^{20}$ $Yb^{3+}$ ions/cm$^3$, in some embodiments. In some embodiments, waveguides are formed by ion exchange of potassium ions for sodium ions using line apertures etched through an aluminum mask layer, as described in U.S. Pat. No. 6,636,678 issued Oct. 21, 2003 to Bendett and McCoy, which is incorporated herein by reference. In some embodiments, pump waveguides and amplifying waveguides produced on one or more slab-type substrates are made substantially according to one or more of the embodiments described in U.S. Pat. No. 6,493,476 issued Dec. 10, 2002 to Bendett, and/or U.S. Patent Application Publication Number US 2002/0106150 A1 filed Nov. 27, 2001, now U.S. Pat. No. 6,954,564 issued Oct. 11, 2005 to Bendett entitled "Apparatus and method for integrated photonic devices having high-performance waveguides and multi-compositional substrates," which are both incorporated herein by reference, but wherein, for some embodiments of the present invention, the pump waveguides or portions of the substrate or superstrate outside the amplifying waveguide include regions and/or waveguides incorporating a wavelength-selective absorbing species, such as thulium, in order to suppress ASE or pump-waveguide modes of the signal wavelength. In some embodiments, the waveguide end faces of the pump waveguide(s) and/or amplifying waveguide(s) are polished perpendicular to the waveguide channels.

FIG. 1D is a magnified perspective view partially in cross-section of single-core-waveguide-plus-suppression-region-within a larger waveguide optical device optical fiber 104 according to some embodiments of the present invention. In some embodiments, device 104 includes optical substrate 130 having an outer region 132 surrounding an inner pump waveguide 131 that contains a smaller-diameter amplifying waveguide 141 and an absorbing region 145. Amplifying waveguide 141 has a higher index of refraction than pump waveguide 131, and so contains signal light within it (for example, by total internal reflection). In some embodiments, absorbing region 145 has the same index of refraction as pump waveguide 131, and so allows both pump light and signal light to easily pass its boundaries in both directions (inwards from pump waveguide 131, and outwards into pump waveguide 131). Pump radiation is introduced into pump waveguide 131, and the pump radiation introduces energy into the amplifying core 141, where the energy provides gain to signal light propagating along the length of amplifying core 141. Any spontaneous emission within the core or signal light that happens to escape the amplifying waveguide 141, would typically be amplified by interaction with pumped species in the cladding, thus establishing a cladding mode of noise propagating in cladding. However, radiation of the signal wavelength can and will pass from pump waveguide 131 into absorbing region 145 (which has the same index of refraction), where it is absorbed. Pump radiation is not absorbed, but passes easily into and out of absorbing region 145. In some embodiments, absorbing region 145 is heavily doped with thulium or other suitable species that preferentially absorbs radiation of the signal wavelength (e.g., light of about 1550-nm wavelength), but does not absorb radiation of the pump wavelength (e.g., light of about 980-nm wavelength).

FIG. 1E is a magnified perspective view partially in cross-section of dual photonic-band-gap cores including suppression region within a secondary cladding optical fiber 105 according to some embodiments of the present invention. In some embodiments, device 105 includes optical fiber 120 having an outer cladding 122 surrounding an inner pump waveguide 123 (in some embodiments, cladding 122 has a lower index of refraction than pump waveguide 123) that contains an amplifying photonic-band-gap (PBG) waveguide 151 (also known as photonic-crystal waveguide 151) and an absorbing waveguide 152. The spacings between openings 150 of the PBG waveguide and the size, shape, and positioning of openings 150 are designed (in some embodiments, using techniques described in U.S. Pat. No. 6,845,204 and/or U.S. Pat. No. 6,856,742, which are both incorporated herein by reference) to allow or enhance coupling of pump-wavelength radiation into the amplifying waveguide 151 from the surrounding area while constraining the signal radiation to substantially remain within waveguide 151. In some embodiments, waveguide 151 includes, within its radius, one or more longitudinal openings (e.g., in some embodiments, these run the entire length of waveguide 151, as shown in FIG. 1I). Amplifying waveguide 151 is defined by and surrounded by a plurality of holes (or, e.g., dielectric areas having a low index of refraction) 150 parallel to an axis of the fiber 120 (e.g., in some embodiments, these run the entire length of the fiber), and are designed such that amplifying waveguide 151 contains signal light within it (for example, by a PBG effect). In some embodiments, absorbing waveguide 152 has the same effective index of refraction as the surrounding area, and so allows both pump light and signal light to easily pass its boundaries in both directions (inwards from pump waveguide 153, and outwards into pump waveguide 153). Pump radiation is introduced into pump waveguide 153, and the pump radiation introduces energy into the amplifying core 151, where the energy provides gain to signal light propagating along the length of amplifying core 151. Any spontaneous emission within the core or signal light that happens to escape the amplifying waveguide 151, would typically be amplified by interaction with pumped species in the cladding, thus establishing a cladding mode of noise propagating in cladding. However, radiation of the signal wavelength can and will pass from pump waveguide 153 into absorbing region 152 where it is absorbed. Pump radiation is not absorbed, but passes easily into and out of absorbing region 152. In some embodiments, absorbing region 152 is heavily doped with thulium or other suitable species that preferentially absorbs radiation of the signal wavelength (e.g., light of about 1550-nm wavelength), but does not absorb radiation of the pump wavelength (e.g., light of about 980-nm wavelength).

FIG. 1F is a magnified perspective view partially in cross-section of single-photonic-band-gap-core-waveguide-plus-suppression-region within a larger secondary cladding optical fiber 106 according to some embodiments of the present invention. Optic fiber 120 includes an outer cladding 122 surrounding an inner pump waveguide 123 (in some embodiments, cladding 122 has a lower index of refraction than pump waveguide 123) that contains an amplifying photonic-band-gap (PBG) waveguide 151 and one or more absorbing regions 155. The spacings between openings 150 of the PBG waveguide and the size, shape, and positioning of openings 150 are designed (in some embodiments, using the teachings of U.S. Pat. No. 6,845,204 and U.S. Pat. No. 6,856,742, which are both incorporated herein by reference) to allow or enhance coupling of pump-wavelength radiation into the amplifying waveguide 151 from the surrounding area while constraining the signal radiation to substantially remain within waveguide 151. In some embodiments, waveguide 151 includes, within its radius, one or more longitudinal openings (e.g., in some embodiments, these run the entire length of waveguide 151, as shown in FIG. 1I). Amplifying waveguide 151 is defined by and surrounded by a plurality of holes (or, e.g., dielectric areas having a low index of refraction) 150 parallel to an axis of the fiber 120 (e.g., in some embodiments, these run the entire length of the fiber), and are designed such that amplifying waveguide 151 contains signal light within it (for example, by a PBG effect). In some embodiments, absorbing regions 155 are external to the PBG holes and have the same effective index of refraction as the surrounding area, and so allow both pump light and signal light to easily pass its boundaries in both directions (inwards from inner cladding 123, and outwards into inner cladding 123). Pump radiation is introduced into pump waveguide 153, and the pump radiation introduces energy into the amplifying core 151, where the energy provides gain to signal light propagating along the length of amplifying core 151. Any spontaneous emission within the core or signal light that happens to escape the amplifying waveguide 151, would typically be amplified by interaction with pumped species in the cladding, thus establishing a cladding mode of noise propagating in cladding. However, radiation of the signal wavelength can and will pass from pump waveguide 153 into absorbing regions 155 where it is absorbed. Pump radiation is not absorbed, but passes easily into and out of absorbing regions 155. In some embodiments, absorbing regions 155 are heavily doped with thulium or other suitable species that preferentially absorbs radiation of the signal wavelength (e.g., light of about 1550-nm wavelength), but does not absorb radiation of the pump wavelength (e.g., light of about 980-nm wavelength).

FIG. 1G is a magnified perspective view partially in cross-section of single-photonic-band-gap-core-waveguide-plus-suppression-region within a larger photonic-band-gap "cladding" optical fiber 107 according to some embodiments of the present invention. In some embodiments, optic fiber 120, rather than an outer cladding of lower index of refraction, includes a fiber material 124 having a PBG ring 154 that constrains the pump-wavelength radiation within its boundaries. Inside PBG structure 154, which constrains the pump-wavelength radiation, are one or more absorbing regions 155, and an inner PBG structure 156 that defines a signal waveguide in its center and which is doped with one or more amplifying species. Inner PBG structure 156 is designed (in some embodiments, using techniques described in U.S. Pat. No. 6,845,204 and/or U.S. Pat. No. 6,856,742, which are both incorporated herein by reference) to allow or enhance coupling of pump-wavelength radiation into the amplifying waveguide 151 from the surrounding area while constraining the signal radiation to substantially remain within waveguide 151.

FIG. 1H is a magnified perspective view partially in cross-section of single-photonic-band-gap-core-waveguide-plus-suppression-region within a larger photonic-band-gap "cladding" optical fiber 108 according to some embodiments of the present invention. In some embodiments, outer PBG structure 154 is designed to keep pump-wavelength radiation within its boundary, and inner PBG structure 156 is designed to allow or enhance coupling of pump-wavelength radiation into the amplifying waveguide 151 from the surrounding area while constraining the signal radiation to substantially remain within waveguide 151. In some embodiments, one or more signal-absorbing waveguides 152 are formed between outer PBG structure 154 and inner PBG structure 156, and are designed to enhance coupling of signal-wavelength radiation into the absorbing species within their boundaries.

FIG. 1I is a magnified perspective view partially in cross-section of dual photonic-band-gap cores including suppression region within a secondary cladding optical fiber 109 according to some embodiments of the present invention. In some embodiments, PBG structure 158 has a regular geometric pattern (such as hexagons, as shown), with a pattern-breaking hole within amplifying region 151 (as well as smaller holes surrounding amplifying region 151), which creates a waveguide to constrain signal-wavelength radiation within it. In some embodiments, signal-wavelength radiation that escapes or is created outside amplifying region 151 but within PBG structure 158 eventually gets into absorbing region 152 where it is absorbed. In some embodiments, outer cladding 122, having a lower index of refraction and surrounding inner "cladding" 123, is used to keep the pump radiation inside the fiber 120.

FIG. 1J is a magnified perspective view partially in cross-section of dual-core-waveguide-plus-suppression-region PBG-waveguide optical device 110 in a slab-type substrate according to some embodiments of the present invention. Optical device 110 is conceptually similar to optical-fiber device 109 described above for FIG. 1I (with like-numbered features as described above), except implemented in or on a slab-type substrate 130. In some embodiments, the top, bottom, and left and right sides are surrounded by a thin outer cladding (not shown), having a lower index of refraction, in order to keep the pump radiation inside slab substrate 130.

FIG. 1K is a magnified perspective view partially in cross-section of single-core-amplifying-waveguide PBG-waveguide within a pump waveguide optical device 111 in a slab-type substrate according to some embodiments of the present invention. Optical device 111 is conceptually similar to optical-fiber device 107 described above for FIG. 1F (with like-numbered features as described above), except implemented in or on a slab-type substrate 130. In some embodiments, pump waveguide 131, having a higher index of refraction than slab bulk portion 132 in order to keep the pump radiation inside pump waveguide 131, includes an absorbing region 155 having substantially the same index of refraction, so as to absorb and suppress cladding modes in the pump waveguide 131.

FIG. 1L is a magnified perspective view partially in cross-section of single-core-amplifying-waveguide having a super-strate-overcladding-pump-waveguide optical device 112 in a slab-type substrate according to some embodiments of the present invention. Lower pump waveguide 133, having a higher index of refraction than slab bulk portion 132, keeps the lower portion of pump radiation inside lower pump waveguide 133. In some embodiments, superstrate-overcladding-pump waveguide 137 includes one or more absorbing regions 155 having substantially the same index of refraction, so as to absorb and suppress cladding modes in the superstrate-overcladding-pump waveguide 137. In some embodiments, superstrate-overcladding-pump waveguide 137 has substantially the same index of refraction as lower pump waveguide 133, so pump radiation and signal radiation pass both ways easily, in order to better surround and infuse amplifying waveguide 151 with pump radiation, and to allow signal-wavelength cladding modes to pass into absorbing regions 155 and be suppressed.

Using Low-NA Cladding to Suppress Cladding Modes

In other embodiments, a solution that reduces cladding modes (which can be used, for example, for ErYb co-doped fibers, as well as for other fibers or waveguides) includes trading off cladding NA (reducing the cladding NA) and cladding diameter. One of the standard-diameter fibers is approximately 20/200 um (micrometer) in core/cladding diameters. In some embodiments, this fiber is pumped with six diodes via a 6+1 star coupler. While the NA of the double-clad fiber is typically 0.45, the star coupler should operate with reasonable loss even if the NA of the cladding is reduced to 0.22. In this case the capture fraction of the cladding waveguide is reduced to a value equivalent to that of the core so self saturation is not much different than the core-pumped case. Some embodiments of this design are illustrated in FIG. 2A1, FIG. 2B1, FIG. 2C, and FIG. 2D.

The most appropriate design depends on the target specification of the amplifier (e.g., the amplifying portion of a fiber laser). If mJ energies with good beam quality are required then a low-NA LMA erbium-doped ytterbium-free core with a small, high-NA cladding and thulium insert is most appropriate for some embodiments. At more modest energies a larger, low-NA (e.g., NA=0.22) cladding with a high-NA (e.g., NA=0.2) ErYb core would be sufficient.

FIG. 2A1 is a magnified perspective view partially in cross-section of dual-clad cladding-pumped optical-fiber device 201 with low NA outer cladding according to some embodiments of the present invention. In some embodiments, optical-fiber device 201 includes an optical fiber 220 having an amplifying core with a higher index of refraction core 211 (e.g., doped with Er and Yb in some embodiments, or, in other embodiments, erbium-doped and Yb-free) having a relatively high NA (e.g., NA=0.2, which is relatively high for a fiber core, and which is determined by the difference in index of refraction or the index profile between the core 211 and the inner cladding layer 221), an inner cladding layer 221 having a medium index of refraction and having a relatively low NA (e.g., NA=0.22, which is relatively low for an inner cladding, and which is determined by the difference in index of refraction or the index profile between the inner cladding layer 221 and the outer cladding layer 222). In some embodiments, signal light is amplified and propagates in core 211, which accepts, and is powered/excited by, pump light that is injected into cladding 221 (i.e., device 201 is a cladding-pumped step-index device having a low-NA cladding).

FIG. 2A2 is a schematic graphical depiction of differing indices of refraction across the diameter of optical fiber 201 shown in FIG. 2A1—index of refraction 222IR across outer cladding layer 222, index of refraction 221IR across inner cladding layer 221, and index of refraction 211IR across core 211. The specific values for each index of refraction are shown in arbitrary units, and actual values are calculated or empirically derived to meet the desired numerical apertures of the core and inner cladding and/or other requirements. The graphical depiction rather gives an idea of the step-index nature of changes in indices of refraction across boundaries between adjacent, different regions of optical fiber 201.

FIG. 2B1 is a magnified perspective view partially in cross-section of dual-clad cladding-pumped optical fiber 202 with low-NA outer cladding with graded-index profiles according to some embodiments of the present invention. This embodiment is similar to that of FIG. 2A1, except that a graded index-of-refraction profile is used between core 211 and inner cladding layer 221 and/or between inner cladding layer 221 and outer cladding layer 222. In some embodiments, signal light is amplified and propagates in core 211, which accepts, and is powered/excited by, pump light that is injected into cladding 221 (i.e., device 202 is a cladding-pumped, graded-index device having a low-NA cladding).

FIG. 2B2 is a schematic graphical depiction of differing indices of refraction across the diameter of optical fiber 202 shown in FIG. 2B1—index of refraction 222IR across outer cladding layer 222, index of refraction 221IR across inner cladding layer 221, and index of refraction 211IR across core 211. The specific values for each index of refraction are shown in arbitrary units, and actual values are calculated or empirically derived to meet the desired numerical apertures of the core and inner cladding and/or other requirements. The graphical depiction rather gives an idea of the graded, ramped-index nature of changes in indices of refraction across boundaries between adjacent, different regions of optical fiber 202—to wit, the graded-index or ramp-refraction-index boundary regions 215IR and 216IR.

FIG. 2C is a magnified perspective view partially in cross-section of single-waveguide core within a low-NA-pump waveguide optical device 203 according to some embodiments of the present invention. This embodiment is similar to that of FIG. 2A1, except that planar device 230 replaces fiber 220, doped waveguide 241 replaces fiber core 211, pump waveguide 231 replaces inner (pump-light) cladding 221, and substrate 232 replaces outer cladding 222. Pump waveguide 231 has a relatively low NA, in order that a relatively high amount of amplified spontaneous emission (ASE) is at a high-enough angle to the edge of waveguide 231 that it escapes, thus suppressing "cladding" modes (i.e., pump-waveguide modes extract relatively little of the pump light since the ASE leaks out of waveguide 231 before it removes much energy). In some embodiments, signal light is amplified and propagates in signal waveguide 241, which accepts, and is powered/excited by, pump light that is injected into pump waveguide 231 (i.e., device 203 is a cladding-pumped, step-index device having a low-NA cladding).

FIG. 2D is a magnified perspective view partially in cross-section of single-core-waveguide within a low-NA-pump waveguide optical device 204 with graded-index profiles according to some embodiments of the present invention. This embodiment is similar to that of FIG. 2C, except that a graded index-of-refraction profile is used between signal waveguide 243 (corresponding to core 211 of FIG. 2B1) and pump waveguide 233 (corresponding to inner cladding layer 221 of FIG. 2B1) and/or between pump waveguide 233 and outer cladding layer 232. In some embodiments, signal light is amplified and propagates in signal waveguide 243, which accepts, and is powered/excited by, pump light that is injected into pump waveguide 233 (i.e., device 204 is a cladding-pumped, graded-index device having a low-NA cladding).

In FIGS. 2E, 2F, 2G, and 2H, the outer photonic-band-gap (PBG) structures are designed to contain (keep from leaking out of the fiber) only low-NA pump light having a small angle relative to the walls, but to allow light having a higher angle relative to the walls (such as ASE noise light) to escape (allow to leak out of the fiber).

Figure 2F:
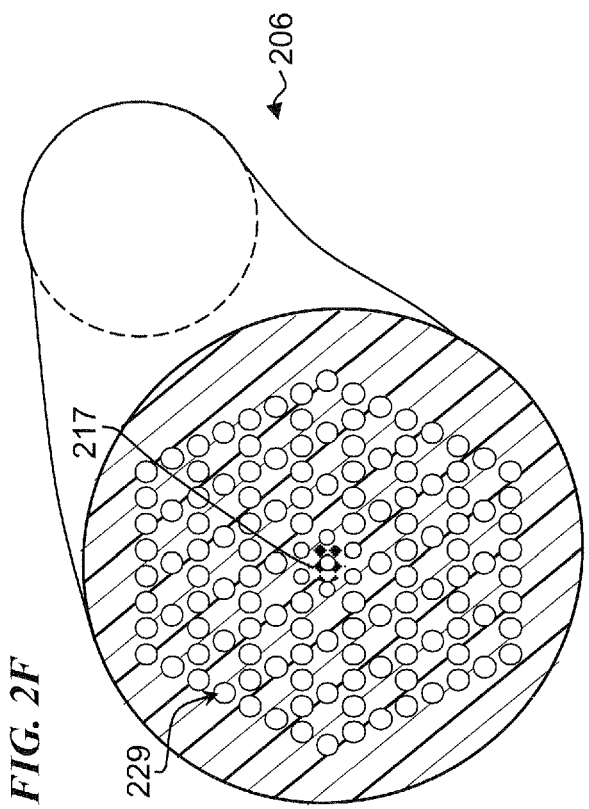
FIG. 2F is a magnified perspective view partially in cross-section of low-NA PBG cladding-pumped optical fiber 206 with low NA outer PBG "cladding" according to some embodiments of the present invention.
Figure 2H:
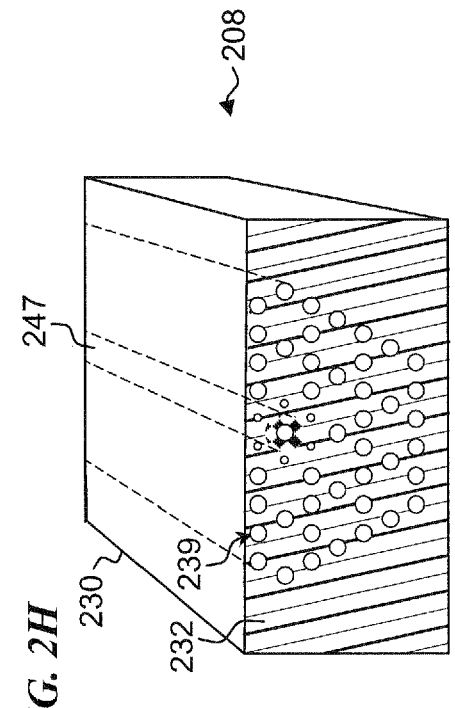
FIG. 2H is a magnified perspective view partially in cross-section of low-NA PBG outer-waveguide-pumped optical device 208 with low-NA outer PBG "cladding" according to some embodiments of the present invention.
Figure 2E:
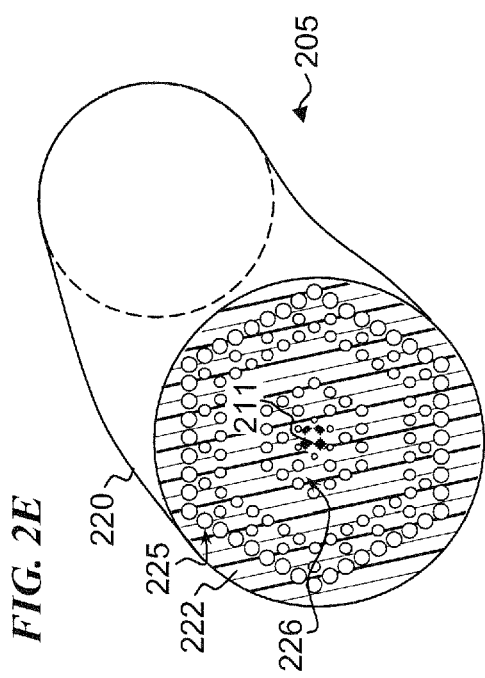
FIG. 2E is a magnified perspective view partially in cross-section of low-NA PBG cladding-pumped optical fiber 205 with low NA outer PBG "cladding" according to some embodiments of the present invention.

FIG. 2E is a magnified perspective view partially in cross-section of low-NA PBG cladding-pumped optical-fiber device 205 with low NA outer PBG "cladding" 225 according to some embodiments of the present invention. In some embodiments, optical-fiber device 205 includes a fiber 220 having an outer PBG cladding ring 225 of PBG longitudinal holes used to contain only such pump light which has a small angle relative to the walls (i.e., this outer cladding has a small NA) within a boundary of a pump-light-carrying cladding (i.e., the pump-light waveguide) defined by the longitudinal holes, These "holes" in the outer ring are structures running the length of fiber 220, each of which comprise air or a material of lower index of refraction as compared to the bulk fiber material 222. They have a size, geometry, pattern and/or spacing designed to reduce coupling of small-angle pump light within PBG cladding ring 225 to its exterior, in order to contain the pump light, but also allow ASE light to escape in order to suppress cladding modes.

In some embodiments, optical-fiber device 205 also includes an inner ring 226 of PBG longitudinal holes. These longitudinal holes in the inner ring 226 are structures running the length of fiber 220, each of which comprise air or a material of lower index of refraction as compared to the bulk fiber material 222. These longitudinal holes are used to contain signal light within the boundary of a signal-carrying core or waveguide (in this case, the signal-light waveguide 211) defined by them.

FIG. 2F is a magnified perspective view partially in cross-section of low-NA PBG cladding-pumped optical-fiber device 206 with low NA outer PBG "cladding" according to some embodiments of the present invention. Device 206 is similar in operation to device 205 described above, except that rather than two rings of PBG structures, a single field 229 of PBG structures is provided that are designed such that they reduce coupling of small-angle pump light within it to its exterior in order to contain the pump light (from injecting pump light into the cladding), but also allow ASE light (larger-angle signal light) to escape in order to suppress cladding modes, as well as constrain the desired signal light in hollow core 217 that propagates the signal light. Hollow core 217 includes, is within, or is next to a doped gain medium that provides signal amplification by absorbing pump light that is constrained within PBG structure 229, and providing stimulated emission to light propagating along hollow core 217.

Figure 2G:
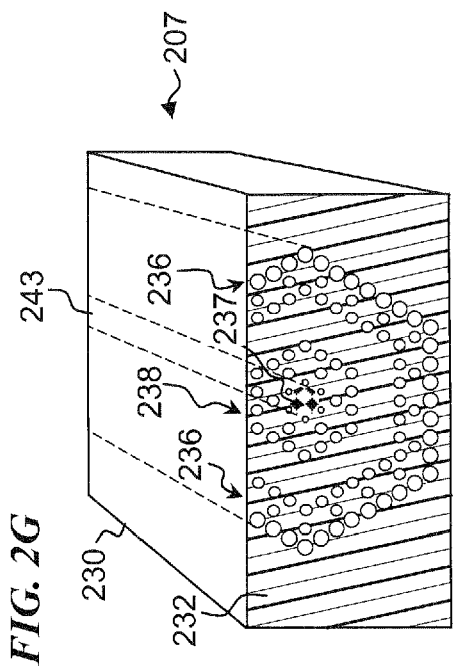
FIG. 2G is a magnified perspective view partially in cross-section of low-NA PBG outer-waveguide-pumped optical device 207 with low-NA outer PBG "cladding" according to some embodiments of the present invention.

FIG. 2G is a magnified perspective view partially in cross-section of low-NA PBG outer-waveguide-pumped optical device 207 with low-NA outer PBG "cladding" according to some embodiments of the present invention. Planar device 207 is similar in concept and operation to fiber device 205 of FIG. 2E, with an outer ring of PBG structures 236, an inner ring of PBG structures 238, and a signal waveguide 243. These structures are designed such that they reduce coupling of small-angle pump light within it to their exterior in order to contain the pump light (from injecting pump light into the outer ring), but also allow ASE light (larger-angle signal light) to escape in order to suppress cladding modes, as well as constrain the desired signal light in core waveguide 237.

FIG. 2H is a magnified perspective view partially in cross-section of low-NA PBG outer-waveguide-pumped optical device 208 with low-NA outer PBG "cladding" according to some embodiments of the present invention. Device 208 is similar in operation to device 207 described above, except that rather than two rings of PBG structures, a single field 239 of PBG structures is provided that are designed such that they reduce coupling of small-angle pump light within it to its exterior in order to contain the pump light (from injecting pump light into the cladding), but also allow ASE light (larger-angle signal light) to escape in order to suppress cladding modes, as well as constrain the desired signal light in hollow core 247. Hollow core 247 includes, is within, or is next to a doped gain medium that provides signal amplification by absorbing pump light that is constrained within structure 239, and providing stimulated emission to light propagating along hollow core 247.

Figure 2I:
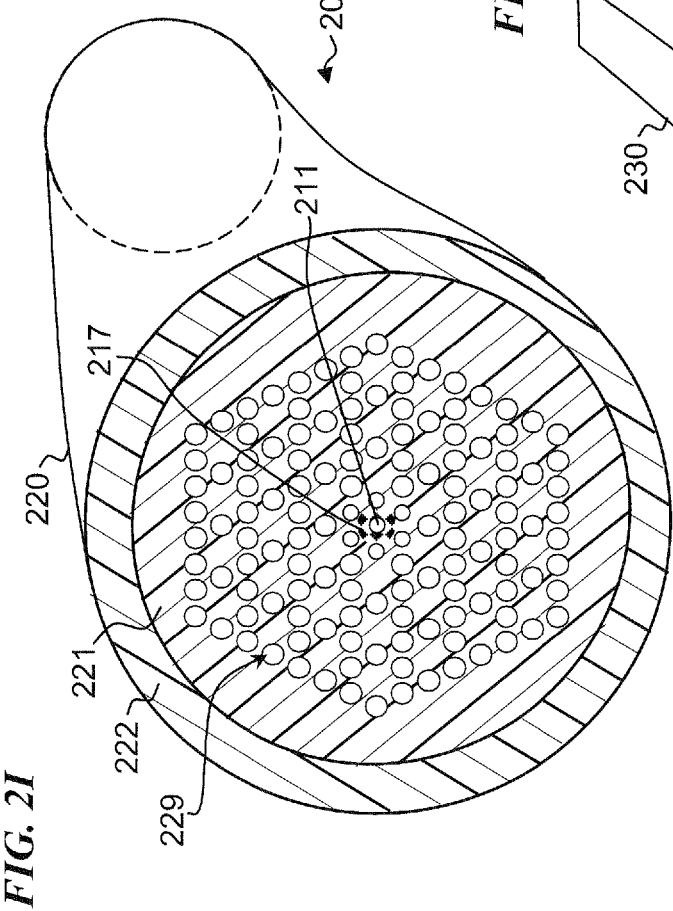
FIG. 2I is a magnified perspective view partially in cross-section of low-NA outer-cladding-pumped PBG-core optical fiber 209 with low-NA index-change outer "cladding" according to some embodiments of the present invention.

FIG. 2I is a magnified perspective view partially in cross-section of low-NA outer-cladding-pumped PBG-core optical fiber 209 with low-NA index-change outer "cladding" according to some embodiments of the present invention. In some embodiments, optical-fiber device 209 includes an optic fiber 220 having an amplifying core 217 formed using a matrix of PBG structures 229 (e.g., doped with Er and Yb in some embodiments, or, in other embodiments, erbium-doped and ytterbium-free) having a relatively high NA (e.g., NA=0.2, which is relatively high for a fiber core, and which is determined by the PBG structures 229), an inner cladding layer 221 in which the PBG structures 229 are embedded and having a relatively low NA (e.g., NA=0.22, which is relatively low for an inner cladding, and which is determined by the difference in index of refraction or the index profile between the inner cladding layer 221 and the outer cladding layer 222). In some embodiments, signal light is amplified and propagates in core 211 (e.g., a hollow core, in some embodiments) surrounded by doped region 217, which accepts, and is powered/excited by, pump light that is injected into cladding 221 and/or its PBG structures (i.e., device 209 is a cladding-pumped PBG-core step-index overcladding device having a low-NA cladding).

Figure 2J:
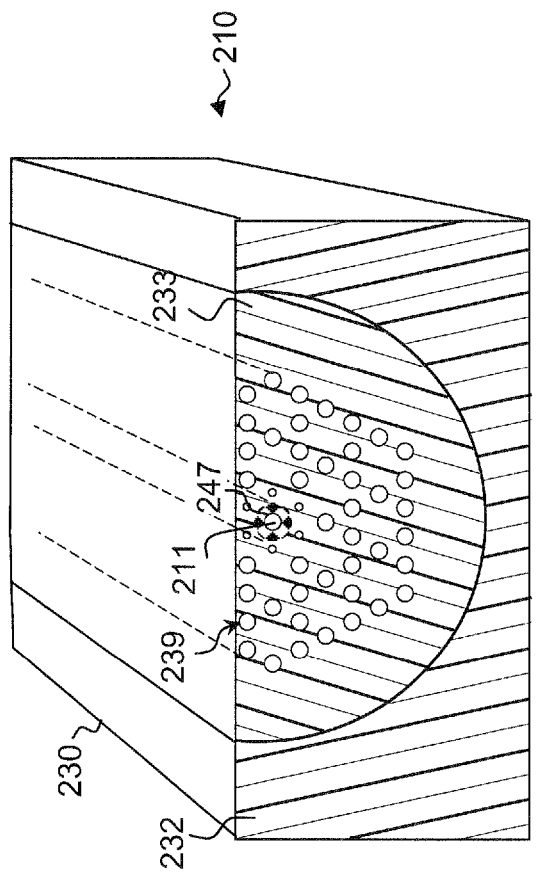
FIG. 2J is a magnified perspective view partially in cross-section of low-NA outer-waveguide-pumped PBG-core optical device 210 with low-NA index-change outer "cladding" according to some embodiments of the present invention.

FIG. 2J is a magnified perspective view partially in cross-section of low-NA outer-waveguide-pumped PBG-core optical device 210 with low-NA index-change outer "cladding" according to some embodiments of the present invention. This embodiment is similar to that of FIG. 2I, except that the PBG-defined core 211 is defined by PBG structures 239 in a slab 230 and inner cladding layer 233 is a waveguide formed within outer cladding layer 232 (i.e., the external portion of slab 230 that surrounds waveguide 233). In some embodiments, signal light is amplified and propagates in core 211 surrounded by doped region 247, which accepts, and is powered/excited by, pump light that is injected into cladding 233 (i.e., device 210 is a cladding-pumped, graded-index-cladding and PBG-core device having a low-NA cladding).

FIG. 3A is a schematic block diagram of an end-cladding-pumped optical amplifier system 301, according to some embodiments of the present invention. Fiber 360, in various embodiments, includes any one of the above-described cladding-pumped optical fibers 101, 102, 105, 106, 107, 108, 109, 201, 202, 205, 206, or any combinations or variations of these. In the embodiment shown, pump-wavelength radiation. In other embodiments, any of the above-described pump-waveguide-pumped optical devices 103, 104, 110, 111, 112, 203, 204, 207, 208, or any combinations or variations of these are substituted for, or combined with, cladding-pumped optical fiber 360.

Figure 3D:
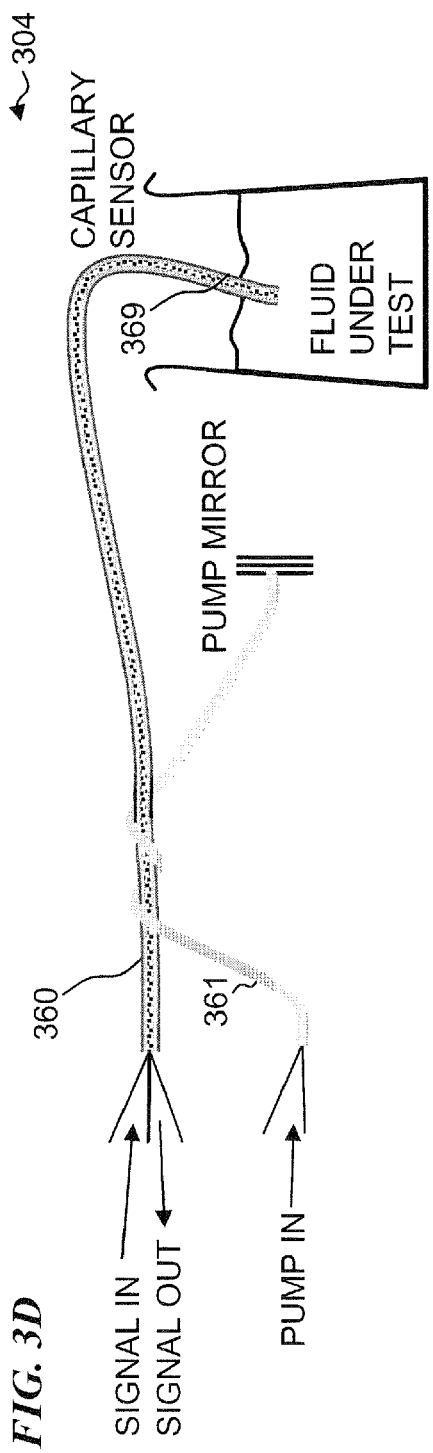
FIG. 3D is a schematic block diagram of a cladding-pumped chemical sensor 304 according to some embodiments of the present invention.

In some embodiments, amplifier system 301 of FIG. 3A (and system 302 of FIG. 3B, system 303 of FIG. 3C, system 304 of FIG. 3D, system 305 of FIG. 3E, and/or system 306 of FIG. 3F) further includes further features, not shown, such as power supplies, laser diodes, optics (linear and/or non-linear), frequency doublers (one or more), frequency quadruplers (one or more), gratings, pulse stretchers, pulse compressors, modulators, controllers, engines, generators, batteries, actuators, vehicles, and/or computers.

FIG. 3B is a schematic block diagram of a star-coupler-cladding-pumped optical amplifier system 302 according to some embodiments of the present invention. Fiber 360, in various embodiments, includes any one of the above-described cladding-pumped optical fibers 101, 102, 105, 106, 107, 108, 109, 201, 202, 205, 206, or any combinations or variations of these. In the embodiment shown, pump-wavelength radiation. In other embodiments, any of the above-described pump-waveguide-pumped optical devices 103, 104, 110, 111, 112, 203, 204, 207, 208, or any combinations or variations of these are substituted for, or combined with, cladding-pumped optical fiber 360. In some embodiments, one or more cladding-pump fibers 361 (only one fiber is shown in FIG. 3B, but up to 6 or more pump fibers 361 are used in other embodiments) inject pump-wavelength radiation into the cladding layer of signal fiber 360 (in some embodiments, signal fiber 360 is pumped from, for example, six laser diodes, each driving its own pump fiber 361, via a six-plus-one (6+1) fiber-star coupler, e.g., in some embodiments, the pump fibers 361 are twisted around signal fiber 360 and the junction is heated just enough to fuse the outer layer of each of the one or more pump fibers to the pump-cladding layer of the signal fiber 360 and/or otherwise fused or optically coupled to signal fiber 360 to enable transfer of pump light into the signal fiber). In some embodiments, the interaction length (the portion shown twisted together) between fiber 360 and fiber 361 is much longer than shown here, and in some such embodiments, fiber 361 includes a mirror or other reflector on its right-hand end (such as shown in FIG. 3D). In some embodiments, amplifier system 302 further includes further features, not shown, such as power supplies, laser diodes, optics (linear and/or non-linear), frequency doublers (one or more), frequency quadruplers (one or more), gratings, pulse stretchers, pulse compressors, modulators, controllers, and/or computers. In some embodiments, the invention includes a method for amplifying a laser light signal that includes amplifying the laser light signal using a device such 301 or 302, suppressing cladding modes of an amplifier portion of the device, and emitting an optical output signal. Some embodiments further include injecting pump light into a cladding or pump waveguide.

FIG. 3C is a schematic block diagram of a cladding-pumped laser system 303 according to some embodiments of the present invention. Fiber 360, in various embodiments, includes any one of the above-described cladding-pumped optical fibers 101, 102, 105, 106, 107, 108, 109, 201, 202, 205, 206, or any combinations or variations of these. In the embodiment shown, pump-wavelength radiation. In other embodiments, any of the above-described pump-waveguide-pumped optical devices 103, 104, 110, 111, 112, 203, 204, 207, 208, or any combinations or variations of these are substituted for, or combined with, cladding-pumped optical fiber 360. Laser device 303 is similar in its pumping features to device 302 above, but adds laser feedback (e.g., mirrors, gratings, rings, or any other suitable feedback mechanisms that force laser signal light to repeatedly pass the length of fiber 360). In some embodiments, the interaction length (the portion shown twisted together) between fiber 360 and fiber 361 is much longer than shown here, and in some such embodiments, fiber 361 includes a mirror or other reflector on its right-hand end. In some embodiments, laser system 303 further includes further features, not shown, such as power supplies, laser diodes, optics (linear and/or non-linear), frequency doublers (one or more), frequency quadruplers (one or more), gratings, pulse stretchers, pulse compressors, modulators, controllers, and/or computers. In some embodiments, the invention includes a method for generating laser light signal that includes amplifying the laser light signal using a laser device such as 303, suppressing cladding modes of an amplifier portion of the laser device, and generating optical signal feedback into the amplifier portion. Some embodiments further include injecting pump light into a cladding or pump waveguide.

FIG. 3D is a schematic block diagram of a cladding-pumped chemical sensor system 304 according to some embodiments of the present invention. Fiber 360, in various embodiments, includes any one of the above-described cladding-pumped optical fibers 101, 102, 105, 106, 107, 108, 109, 201, 202, 205, 206, or any combinations or variations of these. In the embodiment shown, pump-wavelength radiation. In other embodiments, any of the above-described pump-waveguide-pumped optical devices 103, 104, 110, 111, 112, 203, 204, 207, 208, or any combinations or variations of these are substituted for, or combined with, cladding-pumped optical fiber 360. In some embodiments, sensor system 304 includes a signal optical fiber 360 connected to a capillary sensor 369 having one or more capillaries (such as used for PBG structures described above) that admit (e.g., by capillary action and/or vacuum or pressure differences) a liquid or gas fluid, and that provide an interaction between the signal light and the fluid that is used to determine fluid height and/or composition. In some embodiments, sensor system 304 further includes further features, not shown, such as power supplies, laser diodes, optics (linear and/or non-linear), frequency doublers (one or more), frequency quadruplers (one or more), gratings, pulse stretchers, pulse compressors, modulators, controllers, and/or computers. In some embodiments, the invention includes a method for sensing a chemical that includes generating a light signal (e.g., pulses in some embodiments, and continuous wave (CW) in other embodiments) using a system 304, suppressing cladding modes of an optical amplifier or laser, optionally directing the pulses (or CW) of the signal light using an optics and control system, and causing an interaction (such as reflection, refraction, or absorption) with a fluid, and determining an amount, composition, concentration or other property of the fluid. Some embodiments further include injecting pump light into a cladding or pump waveguide.

Figure 3E:
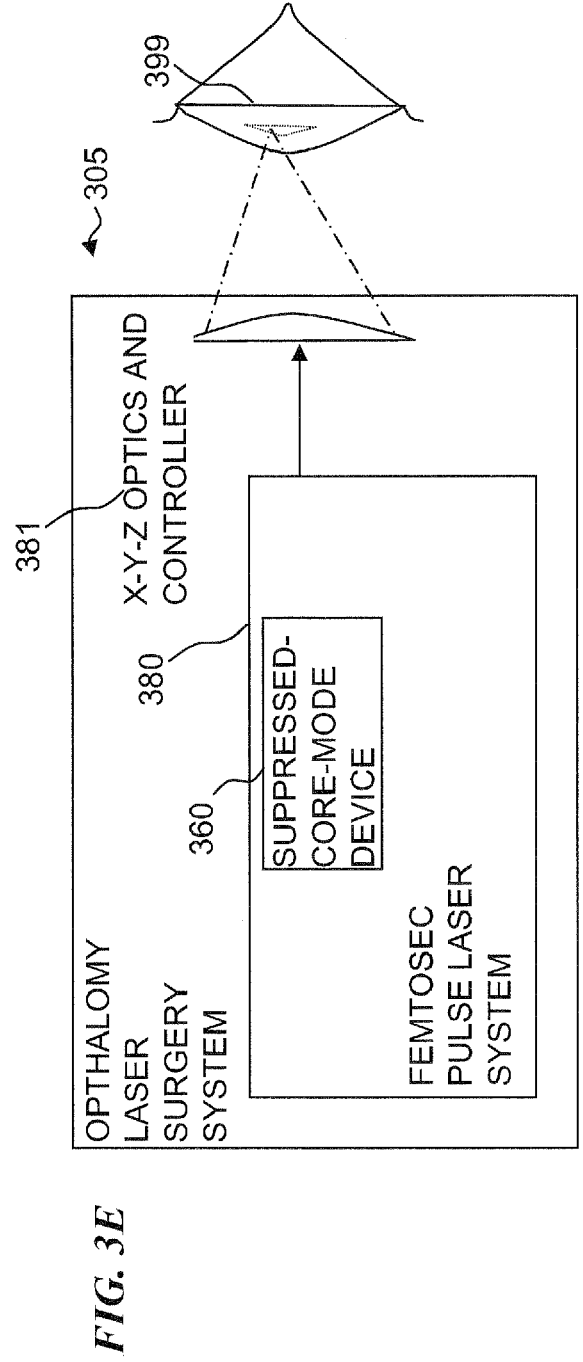
FIG. 3E is a schematic block diagram of a cladding-pumped laser instrument 305 according to some embodiments of the present invention.

FIG. 3E is a schematic block diagram of a cladding-pumped laser instrument 305 according to some embodiments of the present invention. In some embodiments, for example, instrument 305 embodies an opthalmic laser surgery system having a femto-second laser unit 380 that includes a suppressed cladding-mode device 360 (such as described in any one or more of the above-described figures, e.g., device 360, in various embodiments, includes any one of the above-described cladding-pumped optical fibers 101, 102, 105, 106, 107, 108, 109, 201, 202, 205, 206, or any combinations or variations of these. In the embodiment shown, pump-wavelength radiation; in other embodiments, any of the above-described pump-waveguide-pumped optical devices 103, 104, 110, 111, 112, 203, 204, 207, 208, or any combinations or variations of these are substituted for, or combined with, cladding-pumped optical fiber 360 having one or more of the mechanisms described above to suppress cladding modes) and a 2D (X-Y) or 3D (X-Y-Z) optics system and controller 381. In some embodiments, the invention includes a method for operating on a cornea of a human eye 389 that includes generating optical pulses using an instrument such as 305, suppressing cladding modes of an optical amplifier or laser, directing the pulses using an optics and control system such as 381, and causing an interaction (such as ablation) with a tissue of eye 399. Some embodiments further include injecting pump light into a cladding or pump waveguide.

FIG. 3F is a schematic block diagram of a cladding-pumped optical system 370 according to some embodiments of the present invention. In some embodiments, system 370 includes a signal-wavelength amplification system 374 (that, in some embodiments, includes a laser-feedback mechanism such as mirrors or looped fiber to form an optical oscillator or laser, or, in other embodiments, includes an optical input port that obtains laser light from an external source) that includes optically pumped, cladding-pumped, suppressed-cladding-mode gain device 373 that provides gain to the laser signal light, and a pump laser system 372 that provides pump light to suppressed-cladding-mode gain stage 373. In various embodiments of system 370, suppressed-cladding-mode gain device 373 is implemented by any of the suppressed-cladding-mode gain device described above in this specification. Signal-wavelength amplification system 374 outputs signal-wavelength laser light. In some embodiments, suppressed-cladding-mode gain device 373 provides the gain stage within the laser feedback mirrors or other feedback optics and is thus forms a signal laser. In other embodiments, suppressed-cladding-mode gain device 373 is an amplification stage that follows laser signal generation (not shown) elsewhere within system 370. In other embodiments, system 370 receives signal laser light from an external source (not shown) and includes an amplification system that provides gain to that input laser light. One or more power-supply systems 371 provide electrical power to run various components in system 370 (e.g., controllable electrical power for the laser diodes 372 that provide pump light). Optics and controller 375 represents the other optics that are desirable to route, condition, modulate, and otherwise function on the signal and/or pump light within system 370. In some embodiments, system output 377 includes signal laser light that was amplified or originated by gain portion 374. In other embodiments, system 370 is a materials-processing system and system output 377 represents other output (such as, for example, paper printed by a laser printer or xerographic copier that forms system 370, or cut metal or fabric that is cut using the laser beam, or powdered metal that is vaporized by the laser beam and then cooled) that used signal laser light that was amplified or originated by gain portion 374. In some embodiments, the laser light is used in a range-finding LIDAR system used to determine distances (such as between an aircraft and ground, or between two aircraft), and the output is a representation of the distance data obtained, and system 370 represents an entire vehicle such as an automobile, aircraft, spacecraft, or ship. In some embodiments, the laser light is used to illuminate an object or to inject energy into an object to make it fluoresce, in order to obtain image data (including for example, brightness or reflectivity at one or more wavelengths or colors, polarization, fluorescence, height, thickness, or other data), and the output is a representation of the image data obtained, and system 370 represents an entire imaging system, or a vehicle such as an aircraft, spacecraft, automobile, submarine, or ship. In some embodiments, system 370 further includes optical waveguides, amplifiers, lasers, gratings, mirrors, splitters, couplers, switches, and/or detectors. Thus, in various embodiments, system 370 represents an entire system (such as, for example, a vehicle having a laser-ranging subsystem or other laser system) that includes a suppressed-cladding-mode gain device 373 according to the present invention.

FIG. 4A is a perspective view of a single-clad fiber 409, where the single cladding 407 is used to carry pump light and inject that pump light into a core 411, according to some embodiments of the present invention, in which coupling occurs between core modes and cladding modes via a long-period grating. In some embodiments, the long-period grating is imposed on the core using conventional methods or techniques. In some embodiments, a fiber having a large core will tend to support multiple modes. To counteract and/or suppress the higher-order modes and/or ASE (whether traveling left-to-right or right-to-left), some embodiments of the present invention provide a first diffraction grating 408 (marked "A") and optionally one or more spaced-apart second diffraction gratings 405 (marked "B") on portions of the core, wherein the grating(s) will diffract light near the boundary (which tend to be the higher-order modes) into the cladding 407. While this diffracted light is initially forced out of the core, there is a strong possibility that it will later re-enter the core and provide detrimental effects, such as amplified spontaneous emission (ASE) which subtracts from the pump power otherwise available to the desired signal amplification.

For illustrative purposes we show a long-period grating coupling a higher-order mode of the core into a cladding waveguide. In FIG. 4A power is coupled from a higher-order mode at point A (408) into a propagating cladding mode. In the region AB (between 408 and 405), ASE builds up again in this mode and is again coupled out at point B (405). However any backward-propagating cladding light at point B (405) with the correct phase and wavelength properties is susceptible to coupling back into the core in the reverse direction. Thus an ASE filter for higher-order modes based only on this technique would be reduced in effectiveness. The modification shown in FIG. 4B is, in some embodiments, more effective, as cladding modes are attenuated between the perturbation points. The use of cladding-mode attenuation is an enabler for higher-order-mode filtering with long-period or blazed short-period gratings, which couple out higher-order modes from the core. This would be especially useful in scenarios where compositional preferences prohibit the use of low-NA fibers. While the exemplary embodiments shown here in 4A-4B have illustrated a grating-based ASE filter, any other perturbation would be subject to the same reciprocity restrictions. FIGS. 4C-4G show other solutions that address these problems.

FIG. 4B is a perspective view of a single-clad fiber 410, where within the single cladding 407 is located a light-absorbing rod or region 413 (which is shown as a small cylinder here, but in other embodiments, can be other shapes, such as a square, or an annulus around the core), which is used to absorb peripheral-mode light that exits core 411, so that the exited light does not reflect and reenter into core 411. The gratings 408 and 405 assist in getting higher-mode light and ASE to exit core 411, so that it can be absorbed in region 413. In some embodiments, the cladding 407 includes an absorbent doping material 413 that absorbs signal-wavelength light. Thus the lowest-order mode(s) that remain in the core become the dominant mode(s). In other embodiments, one or more additional outer cladding layer(s) is/are provided surrounding cladding 407 in order to form a multiply-clad fiber.

FIG. 4C is a perspective view of a single-clad fiber 419 with one or more bending regions 421 and/or 422 (replacing one or more of the gratings 408 and 405 of FIG. 4A), where the function of the bending regions is to allow peripheral-mode light (e.g., ASE and higher-mode light) propagating along the edge of core 411 to escape from core 411 into cladding 412 (due to the bend radius being tighter than that which can contain low-NA light along the core boundary), with exited-from-the-core light 493 then being reflected light 494 that possibly reenters core 411. While this bend-radius-exiting light is initially forced out of the core, there is a strong possibility that it will later re-enter the core and provide detrimental effects, such as amplified spontaneous emission (ASE) which subtracts from the pump power otherwise available to the desired signal amplification.

FIG. 4D is a perspective view of a single-clad fiber 420 with one or more bending regions 421 and/or 422 (replacing one or more of the gratings 408 and 405 of FIG. 4B), where the function of the bending is to allow peripheral-mode light (e.g., ASE and higher-mode light) propagating along the edge of core 411 to escape from core 411 into cladding 412412 (due to the bend radius being tighter than that which can contain low-NA light along the core boundary), wherein the exited-from-the-core light 493 is then absorbed by one or more light-absorbing rods 423 and 424 located in pump cladding 412 rather than being reflected and reentering core 411. Thus again, the lowest-order mode(s) that remain in the core become the dominant mode(s). In other embodiments, one or more additional outer cladding layer(s) is/are provided surrounding cladding 412 in order to form a multiply-clad fiber.

FIG. 4E is a perspective view of a single-clad fiber 429 with one or more angled-end-caps (or facets) 431, where a portion 493 of the light propagating along the edge of core 411 (typically ASE or higher-mode light that is not desirable) is reflected back by angled-end-cap 431 into cladding 412, and some of that light 494 reflects on the cladding boundary and eventually may reenter core 411. In other embodiments, one or more additional outer cladding layer(s) is/are provided surrounding cladding 412 in order to form a doubly clad fiber. While this angled-end-cap-reflected light is initially forced out of the core, there is a strong possibility that it will later, after one or more reflections from various boundaries, re-enter the core and produce detrimental effects, such as ASE, which subtracts from the pump power otherwise available to the desired signal amplification.

In some embodiments, an angle in excess of eight (8) degrees is very effective in suppressing feedback of signal power into the core of the double-clad fiber. However it is not effective in suppressing feedback into backward-traveling cladding modes. If both ends are angle-cleaved, then certain frequencies can couple light back into the core at the opposite fiber port, forming what is effectively a ring laser which can oscillate at very modest round-trip gains, thus self-saturating the amplifier. This would be particularly problematic in free-space pumped air-clad photonic-crystal fibers or in any bidirectionally free-space pumped double-clad amplifier. In FIG. 4F the use of cladding-mode attenuators prevents this problem from occurring by greatly raising the threshold for round-trip oscillation.

FIG. 4F is a perspective view of a single-clad fiber 430 with one or more angled-end-caps (or facets) 431 and an absorbing rod or region 433 within single cladding 412, where a portion of the light propagating along the edge of core 411 is reflected back by angled-end-cap 431 into cladding 412 and is absorbed by light-absorbing rod or region 433 rather than reentering core 411. By having this stray signal-wavelength light absorbed by the absorbing region 433, there is more pump light available to amplify the desired signal. In some other embodiments, one or more additional outer cladding layer(s) is/are provided surrounding cladding 412 in order to form a doubly-clad or multiply-clad fiber.

FIG. 4G is a perspective view of a double-clad fiber 440 with a ring or annular absorbing and/or ASE-suppression region 443 within the inner cladding 407. In some embodiments, such an annular absorbing region is substituted for the rod or other shaped absorbing region in any of the other Figures presented and described herein. In some embodiments, outer cladding layer 447 surrounds inner cladding 407 to form a doubly clad fiber. One or more gratings on the boundary of core 411 (e.g., gratings 408 and 405) assist in getting higher-mode light and ASE to exit core 411, so that it (493) can be absorbed in region 443. In other embodiments, the one or more gratings are replaced or supplemented by bending regions such as shown in FIG. 4D, and/or angled-end-caps such as shown in FIG. 4F. Thus the lowest-order mode(s) that remain in the core become the dominant mode(s)

In some embodiments, each of the above-described design options yield better performance in pulsed amplifiers. At a given pump power, the repetition rate at which rollover in the energy extraction occurs should shift to lower repetition frequency. One can realistically expect improvements of about a factor of four on conventional cladding pumped designs.

Some embodiments of the invention provide an apparatus that includes an optical-signal amplifier suitable for optical pulses or continuous-wave (CW) radiation and including at least one amplification stage containing a double-clad gain fiber having: a rare-earth-doped primary core that is substantially pumped to provide amplification of signal light in the primary core, and a substantially un-pumped secondary core or doped region configured to provide attenuation of cladding modes within a gain bandwidth of the primary core.

Some embodiments of the invention provide an apparatus that includes a fiber amplifier suitable for optical pulses or CW radiation and including one or more amplification stages at least one of which contains a double-clad gain fiber having: a rare-earth-doped primary core that is substantially pumped to provide amplification of signal light in the primary core, and a substantially un-pumped secondary core or doped region configured to provide attenuation of cladding modes within a gain bandwidth of the primary core.

In some embodiments, the doped primary core includes erbium (Er) ions and the doped secondary core includes thulium (Tm) ions. In some embodiments, the doped primary core includes both erbium and ytterbium (Yb) ions and the secondary core includes thulium ions. In some embodiments, the doped primary core includes ytterbium ions and the secondary core includes thulium ions In some embodiments, the doped primary core includes erbium and ytterbium ions and the doped secondary core includes erbium ions. In some embodiments, the doped primary core contains ytterbium and the doped secondary core contains samarium (Sm). In some embodiments, the doped primary core contains neodymium (Nd) and the doped primary core contains thulium. In some embodiments, the doped primary core contains neodymium and the doped secondary core contains samarium.

Some embodiments of the invention provide an apparatus that includes a fiber amplifier suitable for optical pulses and that includes one or more amplification stages, at least one of which contains a double-clad gain fiber having: a doped primary signal core having a first index of refraction; an undoped primary (or inner) cladding having a second index of refraction; and an undoped secondary (or outer) cladding having a third index of refraction; wherein the first index of refraction is greater than the second index of refraction, and the second index of refraction is greater than the third index of refraction.

In some embodiments, an absorbing region doped with a species that absorbs light of the signal wavelength is placed within the primary cladding, in order to suppress cladding modes (i.e., modes of signal wavelength that otherwise propagate in the cladding and eventually may re-enter the core to become parasitic modes depleting energy intended for amplifying the primary signal).

In some embodiments, the present invention provides an apparatus that includes a fiber amplifier including one or more amplification stages, at least one of which contains a cladded gain fiber having one or more primary cores doped with a rare-earth lasing species, a pump cladding surrounding the primary core(s), wherein the pump cladding conducts pump light along and into the primary core(s) to provide energy for amplification of light of a signal wavelength within a gain bandwidth of the rare-earth lasing species, and one or more doped secondary regions that absorb light of the signal wavelength and are configured to provide attenuation of undesired modes within the gain bandwidth of the primary core(s).

In some embodiments, the gain fiber includes a single primary core and a single secondary absorbing region. In some embodiments, the gain fiber includes a single primary core. In some embodiments, the gain fiber includes a single secondary absorbing region.

In some embodiments, at least one primary core is doped with erbium ions. In some embodiments, at least one primary core is doped with erbium (Er) and ytterbium (Yb) ions. In some embodiments, at least one primary core is doped with neodymium (Nd) ions. In some embodiments, at least one primary core is doped with one or more other rare-earth ions.

In some embodiments, each absorbing secondary region that absorbs stray light of the signal wavelength is located within the pump cladding. In some embodiments, each secondary region includes one or more annular or ring-shaped regions surrounding the primary core (in some embodiments, these annular or ring-shaped regions are located within the pump cladding). In some embodiments, each secondary region includes a hemi-cylindrical or partial-ring-shaped region adjacent to the core, within the pump cladding. In some embodiments, each secondary region includes one or more cylindrical rod-shaped sub-regions located within the pump cladding. In some embodiments, each secondary region includes one or more rod-shaped sub-regions that are other than cylindrically shaped and are located within the pump cladding. In some embodiments, at least one secondary region is doped with thulium (Tm). In some embodiments, at least one secondary region is doped with samarium (Sm). In some embodiments, at least one secondary region is doped with erbium (Er). In some embodiments, at least one secondary region is doped with one or more other rare-earth ions.

In some embodiments, the present invention provides an apparatus that includes a fiber amplifier including one or more amplification stages, at least one of which contains a cladded gain fiber having a primary core doped with a rare-earth lasing species, a pump cladding surrounding the primary core, wherein the pump cladding conducts pump light along and into the core to provide energy for amplification of light of a signal wavelength within a gain bandwidth of the rare-earth lasing, and a doped secondary region that absorbs light of the signal wavelength and is configured to provide attenuation of undesired modes within the gain bandwidth of the primary core.

In some embodiments, the doped primary core includes erbium ions and the doped secondary region is located within the pump cladding and includes thulium ions. In some embodiments, the doped primary core includes both erbium and ytterbium ions and the doped secondary region includes thulium ions. In some embodiments, the doped primary core includes ytterbium ions and the doped secondary region includes thulium ions. In some embodiments, the doped primary core includes erbium and ytterbium ions and the doped secondary region includes erbium ions. In some embodiments, the doped primary core includes ytterbium and the doped secondary region includes samarium. In some embodiments, the doped primary core includes neodymium and the doped secondary region includes thulium. In some embodiments, the doped primary core includes neodymium and the doped secondary region includes samarium.

In some embodiments, the present invention provides an apparatus that includes a fiber amplifier suitable for optical pulses and that includes one or more amplification stages at least one of which contains a double-clad gain fiber having a doped inner core having a first index of refraction, an undoped primary cladding having a second index of refraction, and an undoped secondary cladding having a third index of refraction, wherein the first index of refraction is greater than the second index of refraction, and the second index of refraction is greater than the third index of refraction.

In some such embodiments, the numerical aperture between inner core and primary cladding is substantially equivalent to the numerical aperture between primary and secondary cladding. In some embodiments, the inner core is doped with erbium and ytterbium. In some embodiments, the inner core is doped with ytterbium. In some embodiments, the inner core is doped with thulium.

In some embodiments, the NA of the cladding is less than 0.25. In some embodiments, the numerical aperture of the inner core is in the range of about 0.06 to about 0.25.

In some embodiments, the present invention provides a method for amplifying a laser light signal that includes amplifying the laser light signal, suppressing cladding modes, and emitting an optical output signal.

Some embodiments further include injecting pump light into a cladding, and coupling the pump light into a signal-containing fiber core.

Some embodiments further include injecting pump light into a pump waveguide, and coupling the pump light into a signal waveguide (for example, a surface waveguide on a slab substrate).

In some embodiments, the present invention provides an apparatus that includes an optical-signal amplifier suitable for optical pulses or continuous-wave (CW) radiation and including at least one amplification stage containing a clad gain fiber having a primary core doped with a rare-earth lasing species, a pump cladding surrounding the primary core, wherein the pump cladding conducts pump light along and into the primary core to provide energy for amplification of light of a signal wavelength within a gain bandwidth of the rare-earth lasing species, and means for absorbing cladding-mode signal light within a gain bandwidth of the primary core.

Some embodiments further include an outer cladding surrounding the pump cladding and configured to contain pump light within the pump cladding.

In some embodiments, the means for absorbing is located within the pump cladding.

In some embodiments, the means for absorbing includes thulium ions.

In some embodiments, the numerical aperture between inner core and primary cladding is substantially equivalent to the numerical aperture between primary and secondary cladding.

In some embodiments, the double-clad fiber is perturbed in a discrete, distributed or periodic manner such that a power exchange between core and cladding modes takes place. In some embodiments, the means of perturbation is a bend or series of bends. In some embodiments, the means of perturbation are blazed fiber bragg gratings. In some embodiments, the means of perturbation are long-period gratings. In some embodiments, the means of perturbation are tapers. In some embodiments, the means of perturbation is a fiber coupler. In some embodiments, the means of perturbation is distributed Rayleigh scattering. In some embodiments, the means of perturbation is reflection from one or more end-faces.

In some embodiments, the coupling is substantially between higher-order modes of the core and modes of the cladding. In some embodiments, the coupling is substantially between the fundamental mode of the core and a mode of the cladding, and wherein one or more higher-order core modes remain guided.

In some embodiments, the primary (or inner) signal core is doped with Er and Yb. In some embodiments, the inner core is doped with Yb. In some embodiments, the inner core is doped with Tm. In some embodiments, the inner core is doped with a rare earth other than Er, Yb or Tm. In some embodiments, the inner core is doped with two or more rare earths.

In some embodiments, the numerical aperture (NA) of the cladding is less than 0.30. In some embodiments, the NA of the cladding is less than 0.29. In some embodiments, the NA of the cladding is less than 0.28. In some embodiments, the NA of the cladding is less than 0.27. In some embodiments, the NA of the cladding is less than 0.26. In some embodiments, the NA of the cladding is less than 0.25. In some embodiments, the NA of the cladding is less than 0.24. In some embodiments, the NA of the cladding is less than 0.23. In some embodiments, the NA of the cladding is less than 0.22. In some embodiments, the NA of the cladding is less than 0.21. In some embodiments, the NA of the cladding is less than 0.20. In some embodiments, the NA of the cladding is in a range between the values of a selected pair of the above mentioned NA values.

In some embodiments, the numerical aperture of the inner core is in the range of about 0.06 to about 0.25.

In some embodiments, the NA of the inner core is about 0.29. In some embodiments, the NA of the inner core is about 0.28. In some embodiments, the NA of the inner core is about 0.27. In some embodiments, the NA of the inner core is about 0.26. In some embodiments, the NA of the inner core is about 0.25. In some embodiments, the NA of the inner core is about 0.24. In some embodiments, the NA of the inner core is about 0.23. In some embodiments, the NA of the inner core is about 0.22. In some embodiments, the NA of the inner core is about 0.21. In some embodiments, the NA of the inner core is about 0.20. In some embodiments, the NA of the inner core is about 0.19. In some embodiments, the NA of the inner core is about 0.18. In some embodiments, the NA of the inner core is about 0.17. In some embodiments, the NA of the inner core is about 0.16. In some embodiments, the NA of the inner core is about 0.15. In some embodiments, the NA of the inner core is about 0.14. In some embodiments, the NA of the inner core is about 0.13. In some embodiments, the NA of the inner core is about 0.12. In some embodiments, the NA of the inner core is about 0.11. In some embodiments, the NA of the inner core is about 0.10. In some embodiments, the NA of the inner core is about 0.09. In some embodiments, the NA of the inner core is about 0.08. In some embodiments, the NA of the inner core is about 0.07. In some embodiments, the NA of the inner core is about 0.06. In some embodiments, the NA of the inner core is about 0.05. In some embodiments, the NA of the inner core is about 0.04. In some embodiments, the NA of the inner core is about 0.03. In some embodiments, the NA of the inner core is about 0.02. In some embodiments, the NA of the inner core is about 0.01. In some embodiments, the NA of the inner core is in a range between a pair of the above mentioned NA values.

Some embodiments of the invention provide a method for amplifying a laser light signal that includes amplifying the laser light signal; suppressing cladding modes; and emitting an optical output signal.

Some embodiments of the method further include injecting pump light into a cladding, and coupling the pump light into a signal-containing fiber core.

Some embodiments of the method further include injecting pump light into a pump waveguide, and coupling the pump light into a signal waveguide.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
   a fiber amplifier including one or more amplification stages, at least one of which contains a cladded gain fiber having:
      a primary core doped with a rare-earth lasing species;
      a pump cladding surrounding the primary core, wherein the pump cladding conducts pump light along and into the core to provide energy for amplification of light of a signal wavelength within a gain bandwidth of the rare-earth lasing species;
      an outer cladding surrounding the pump cladding, wherein the outer cladding is used to contain the pump light within the pump cladding;
      a doped secondary region outside the core and inside the pump cladding that absorbs light of the signal wavelength and is configured to provide attenuation of undesired modes within the gain bandwidth of the primary core; and
      one or more grating perturbations configured to couple light from the core into the pump cladding.

2. The apparatus of claim 1, wherein the doped primary core includes erbium ions and the doped secondary region includes thulium ions.

3. The apparatus of claim 1, wherein the doped primary core includes both erbium and ytterbium ions and the doped secondary region includes thulium ions.

4. The apparatus of claim 1, wherein the doped primary core includes ytterbium ions and the doped secondary region includes thulium ions.

5. The apparatus of claim 1, wherein the doped primary core includes erbium and ytterbium ions and the doped secondary region includes erbium ions.

6. The apparatus of claim 1, wherein the doped primary core includes ytterbium and the doped secondary region includes samarium.

7. The apparatus of claim 1, wherein the doped primary core includes neodymium and the doped secondary region includes thulium.

8. The apparatus of claim 1, wherein the doped primary core includes neodymium and the doped secondary region includes samarium.

9. The apparatus of claim 1, wherein the doped secondary region includes a photonic-crystal structure.

10. The apparatus of claim 1, wherein the primary core and the pump cladding are fabricated on a slab-type substrate.

11. A method for amplifying a laser light signal comprising:

amplifying the laser light signal having a signal wavelength in an optical signal-containing waveguide that is surrounded by a pump cladding that in turn is surrounded by an outer cladding;

containing pump light within an outer boundary of the pump cladding;

gratingly perturbing the light signal such that one or more optical-waveguide modes are coupled into one or more cladding modes in the pump cladding;

suppressing the one or more cladding modes by absorbing light having the signal wavelength from the one or more cladding modes within the pump cladding and outside the optical signal-containing waveguide, wherein the absorbing occurs in less than all the pump cladding and thus attenuating undesired modes within a gain bandwidth of the amplifying; and emitting an optical output signal.

12. The method of claim 11, wherein the optical signal-containing waveguide is a signal-containing core of an optical fiber, the method further comprising injecting pump light into the pump cladding, and coupling the pump light from the pump cladding into the signal-containing core.

13. The method of claim 11, wherein the optical signal-containing waveguide and its pump cladding are fabricated on a slab-type substrate, the method further comprising injecting pump light into the pump cladding, which forms a pump waveguide, and coupling the pump light from the pump waveguide into the signal-containing waveguide.

14. The method of claim 11, wherein the suppressing of the one or more cladding modes includes providing a photonic-crystal-defined absorbing region.

15. An apparatus comprising:
an optical-signal amplifier suitable for optical pulses or continuous-wave (CW) radiation and including at least one amplification stage containing a clad gain fiber, wherein the gain fiber is a double-clad fiber having:
a primary core doped with a rare-earth lasing species,
a pump cladding surrounding the primary core, wherein the pump cladding conducts pump light along and into the primary core to provide energy for amplification of light of a signal wavelength within a gain bandwidth of the rare-earth lasing species,
an outer cladding surrounding the pump cladding and configured to contain pump light within the pump cladding,
means for absorbing cladding-mode signal light within a gain bandwidth of the primary core, wherein the means for absorbing is located within the pump cladding and
means for gratingly perturbing the fiber in order that a power exchange between core and cladding modes takes place.

16. The apparatus of claim 15, wherein the means for absorbing includes thulium ions.

17. The apparatus of claim 15, further comprising one or more bend perturbations configured to provide a power exchange between core and cladding modes.

18. The apparatus of claim 15, in which the means for gratingly perturbing includes one or more blazed fiber bragg gratings.

19. The apparatus of claim 15, in which the means for gratingly perturbing includes one or more long-period gratings.

20. The apparatus of claim 15, further comprising one or more taper perturbations configured to provide a power exchange between core and cladding modes.

21. The apparatus of claim 15, further comprising one or more fiber coupler perturbations configured to provide a power exchange between core and cladding modes.

22. The apparatus of claim 15, further comprising distributed Rayleigh scattering perturbations configured to provide a power exchange between core and cladding modes.

23. The apparatus of claim 15, further comprising reflection perturbations from one or more end-faces configured to provide a power exchange between core and cladding modes.

24. The apparatus of claim 15, wherein the power exchange is substantially between higher-order modes of the core and modes of the cladding.

25. The apparatus of claim 15, wherein the power exchange is substantially between the fundamental mode of the core and a mode of the cladding, and wherein one or more higher-order core modes remain guided.

26. The apparatus of claim 15, in which the means for gratingly perturbing includes one or more short-period gratings.

27. The apparatus of claim 15, wherein the means for gratingly perturbing perturbs the fiber in a discrete manner using spaced-apart diffraction gratings along a length of the fiber.

28. The apparatus of claim 15, wherein the means for gratingly perturbing perturbs the fiber in a distributed manner along a length of the fiber.

29. The apparatus of claim 15, wherein the means for gratingly perturbing perturbs the fiber in a periodic manner using spaced-apart diffraction gratings along a length of the fiber.

30. The apparatus of claim 15, wherein the means for absorbing cladding-mode signal light includes a photonic-crystal-defined absorbing region.

31. The apparatus of claim 15, wherein the primary core and the pump cladding are fabricated on a slab-type substrate.

32. An apparatus comprising:
a fiber amplifier including one or more amplification stages, at least one of which contains a cladded gain fiber having:
a primary core doped with a rare-earth lasing species;
a pump cladding surrounding the primary core, wherein the pump cladding conducts pump light along and into the core to provide energy for amplification of light of a signal wavelength within a gain bandwidth of the rare-earth lasing species;
an outer cladding surrounding the pump cladding wherein the outer cladding is used to contain the pump light within the pump cladding;
a doped secondary region outside the primary core and inside the pump cladding that absorbs light of the signal wavelength and is configured to provide attenuation of undesired modes within the gain bandwidth of the primary core; and
two or more perturbations spaced-apart along a length of the fiber amplifier, each one of which is configured to couple, from the primary core into the pump cladding, ASE and higher-mode light propagating along an edge of the core.

* * * * *